US009277487B2

United States Patent
Wang et al.

(10) Patent No.: US 9,277,487 B2
(45) Date of Patent: Mar. 1, 2016

(54) CELL DETECTION WITH INTERFERENCE CANCELLATION

(75) Inventors: Michael M. Wang, San Diego, CA (US); Ravi Palanki, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 800 days.

(21) Appl. No.: 12/487,580

(22) Filed: Jun. 18, 2009

(65) Prior Publication Data

US 2010/0029262 A1 Feb. 4, 2010

Related U.S. Application Data

(60) Provisional application No. 61/085,757, filed on Aug. 1, 2008.

(51) Int. Cl.
| | |
|---|---|
| *H04W 4/00* | (2009.01) |
| *H04W 48/16* | (2009.01) |
| *H04B 1/7107* | (2011.01) |
| *H04J 11/00* | (2006.01) |
| *H04J 1/14* | (2006.01) |
| *H04W 64/00* | (2009.01) |

(52) U.S. Cl.
CPC .............. *H04W 48/16* (2013.01); *H04B 1/7107* (2013.01); *H04J 11/004* (2013.01); *H04J 11/0093* (2013.01); *H04W 64/003* (2013.01)

(58) Field of Classification Search
None
See application file for complete search history.

(56) References Cited

U.S. PATENT DOCUMENTS

| | | | |
|---|---|---|---|
| 4,718,066 | A | 1/1988 | Rogard |
| 4,885,744 | A | 12/1989 | Lespagnol et al. |
| 5,172,118 | A | 12/1992 | Peregrim et al. |

(Continued)

FOREIGN PATENT DOCUMENTS

| | | |
|---|---|---|
| CN | 1207835 A | 2/1999 |
| CN | 1250269 A | 4/2000 |

(Continued)

OTHER PUBLICATIONS

3GPP Draft; 25.814-V1.5.0, 3rd Generation Partnership Project (3GPP), Mobile Competence Centre ; 650, Route Des Lucioles ; F-06921 Sophia-antipolis Cedex ; France, vol . RAN WG1, no. Shanghai, China; 20060526, May 26, 2006, XP050102001, pp. 1-125.

(Continued)

*Primary Examiner* — Eunsook Choi
(74) *Attorney, Agent, or Firm* — Nerrie M. Zohn

(57) ABSTRACT

Techniques for performing cell detection with interference cancellation are described. In an aspect, a user equipment (UE) may detect for pilots from cells in a wireless network using interference cancellation. The UE may process a received signal to detect for pilots from one or more cells. The pilots may be common pilots transmitted with a reuse factor of one or low reuse pilots transmitted with a reuse factor greater than one. The UE may estimate the interference from a detected cell (e.g., the strongest detected cell) and may cancel the estimated interference from the received signal. The UE may then process the interference-canceled signal to detect for pilots from additional cells. The UE may be able to detect pilots from more cells, e.g., from weaker cells, by canceling the interference due to the pilots from the detected cells. This may be desirable for various applications such as positioning.

20 Claims, 9 Drawing Sheets

(56) References Cited

U.S. PATENT DOCUMENTS

| | | | |
|---|---|---|---|
| 5,173,702 A | 12/1992 | Young et al. |
| 5,173,703 A | 12/1992 | Mangiapane et al. |
| 5,185,608 A | 2/1993 | Pozgay |
| 5,267,249 A | 11/1993 | Dong |
| 5,710,784 A | 1/1998 | Kindred et al. |
| 5,721,745 A | 2/1998 | Hladik et al. |
| 5,751,725 A | 5/1998 | Chen |
| 5,774,450 A | 6/1998 | Harada et al. |
| 5,774,496 A | 6/1998 | Butler et al. |
| 5,887,035 A | 3/1999 | Molnar |
| 5,960,361 A | 9/1999 | Chen |
| 5,983,383 A | 11/1999 | Wolf |
| 6,108,373 A | 8/2000 | Fargues et al. |
| 6,169,759 B1 | 1/2001 | Kanterakis et al. |
| 6,208,699 B1 | 3/2001 | Chen et al. |
| 6,259,730 B1 | 7/2001 | Solondz |
| 6,282,233 B1 | 8/2001 | Yoshida |
| 6,285,682 B1 | 9/2001 | Proctor et al. |
| 6,396,867 B1 | 5/2002 | Tiedemann, Jr. et al. |
| 6,480,558 B1 * | 11/2002 | Ottosson et al. ............. 375/350 |
| 6,496,706 B1 | 12/2002 | Jou et al. |
| 6,532,254 B1 | 3/2003 | Jokinen |
| 6,545,989 B1 | 4/2003 | Butler |
| 6,553,224 B1 | 4/2003 | Kim |
| 6,587,522 B1 | 7/2003 | Wheeler et al. |
| 6,590,881 B1 | 7/2003 | Wallace et al. |
| 6,615,030 B1 | 9/2003 | Saito et al. |
| 6,628,707 B2 | 9/2003 | Rafie et al. |
| 6,633,601 B1 | 10/2003 | Yang |
| 6,741,661 B2 | 5/2004 | Wheatley, III et al. |
| 6,744,814 B1 | 6/2004 | Blanksby et al. |
| 6,747,963 B1 | 6/2004 | Park et al. |
| 6,765,531 B2 | 7/2004 | Anderson |
| 6,765,894 B1 | 7/2004 | Hayashi |
| 6,771,689 B2 | 8/2004 | Solondz |
| 6,771,934 B2 | 8/2004 | Demers et al. |
| 6,834,197 B2 | 12/2004 | Nakahara et al. |
| 6,907,092 B1 | 6/2005 | Yakhnich et al. |
| 6,917,607 B1 | 7/2005 | Yeom et al. |
| 6,931,030 B1 | 8/2005 | Dogan |
| 6,934,264 B2 | 8/2005 | Jou |
| 6,956,893 B2 | 10/2005 | Frank et al. |
| 6,959,010 B1 | 10/2005 | Bahrenburg et al. |
| 6,975,604 B1 | 12/2005 | Ishida et al. |
| 6,977,888 B1 | 12/2005 | Frenger et al. |
| 6,983,166 B2 | 1/2006 | Shiu et al. |
| 6,985,516 B1 | 1/2006 | Easton et al. |
| 7,006,439 B2 | 2/2006 | Thron et al. |
| 7,006,795 B2 | 2/2006 | Foschini et al. |
| 7,013,147 B1 | 3/2006 | Kuwahara et al. |
| 7,023,880 B2 | 4/2006 | El-Maleh et al. |
| 7,031,742 B2 | 4/2006 | Chen et al. |
| 7,042,869 B1 | 5/2006 | Bender |
| 7,051,268 B1 | 5/2006 | Sindhushayana et al. |
| 7,107,031 B2 | 9/2006 | Kristensson et al. |
| 7,116,735 B2 | 10/2006 | Yamada et al. |
| 7,123,590 B2 | 10/2006 | Mir et al. |
| 7,130,365 B2 | 10/2006 | Li |
| 7,167,502 B1 | 1/2007 | Tsaur |
| 7,187,736 B2 | 3/2007 | Buckley et al. |
| 7,200,172 B2 | 4/2007 | Pukkila et al. |
| 7,224,962 B1 | 5/2007 | Kite |
| 7,295,636 B2 | 11/2007 | Onggosanusi et al. |
| 7,298,806 B1 | 11/2007 | Varma et al. |
| 7,302,009 B2 | 11/2007 | Walton et al. |
| 7,308,056 B2 | 12/2007 | Pukkila et al. |
| 7,313,189 B2 | 12/2007 | Yoshida et al. |
| 7,315,527 B2 | 1/2008 | Wei et al. |
| 7,349,379 B2 | 3/2008 | Schmidl et al. |
| 7,406,065 B2 | 7/2008 | Willenegger et al. |
| 7,466,666 B2 | 12/2008 | Yoon et al. |
| 7,613,144 B2 | 11/2009 | Malladi et al. |
| 7,620,662 B2 | 11/2009 | Kassai et al. |
| 7,630,321 B2 | 12/2009 | Jain et al. |
| 7,649,839 B2 | 1/2010 | Dendy |
| 7,650,116 B2 | 1/2010 | Haartsen et al. |
| 7,693,210 B2 | 4/2010 | Margetts et al. |
| 7,706,430 B2 | 4/2010 | Guo et al. |
| 7,724,701 B2 | 5/2010 | Lundby et al. |
| 7,764,726 B2 | 7/2010 | Simic et al. |
| 7,881,711 B2 | 2/2011 | Lundby |
| 8,077,637 B2 | 12/2011 | Fujimoto |
| 8,160,002 B2 | 4/2012 | Rajkotia et al. |
| 8,201,039 B2 | 6/2012 | Tiedemann, Jr. et al. |
| 8,259,848 B2 | 9/2012 | Malladi |
| 8,332,710 B2 | 12/2012 | Tsai et al. |
| 8,369,214 B2 | 2/2013 | Kim et al. |
| 8,396,440 B2 | 3/2013 | Canpolat et al. |
| 8,411,618 B2 | 4/2013 | Kim et al. |
| 8,422,955 B2 | 4/2013 | Smee et al. |
| 8,428,109 B2 | 4/2013 | Yang et al. |
| 8,442,441 B2 | 5/2013 | Pfister et al. |
| 8,489,128 B2 | 7/2013 | Lundby |
| 8,588,119 B2 | 11/2013 | Panta et al. |
| 8,611,305 B2 | 12/2013 | Black et al. |
| 8,630,602 B2 | 1/2014 | Attar et al. |
| 8,660,145 B2 | 2/2014 | Carmon et al. |
| 8,787,509 B2 | 7/2014 | Sikri et al. |
| 2001/0018650 A1 | 8/2001 | Dejaco |
| 2001/0021229 A1 | 9/2001 | Belaiche |
| 2002/0006138 A1 | 1/2002 | Odenwalder |
| 2002/0046379 A1 | 4/2002 | Miki et al. |
| 2002/0071407 A1 | 6/2002 | Koo et al. |
| 2002/0093937 A1 | 7/2002 | Kim et al. |
| 2002/0131381 A1 | 9/2002 | Kim et al. |
| 2002/0131532 A1 | 9/2002 | Chi et al. |
| 2002/0132625 A1 * | 9/2002 | Ogino et al. ................... 455/456 |
| 2002/0181557 A1 | 12/2002 | Fujii |
| 2003/0004784 A1 | 1/2003 | Li et al. |
| 2003/0041206 A1 | 2/2003 | Dickie |
| 2003/0063596 A1 | 4/2003 | Arslan et al. |
| 2003/0078067 A1 | 4/2003 | Kim et al. |
| 2003/0103470 A1 | 6/2003 | Yafuso |
| 2003/0112370 A1 | 6/2003 | Long et al. |
| 2003/0119451 A1 * | 6/2003 | Jang .................... H04B 1/7097 455/67.13 |
| 2003/0125037 A1 | 7/2003 | Bae et al. |
| 2003/0134656 A1 | 7/2003 | Chang et al. |
| 2003/0147476 A1 | 8/2003 | Ma et al. |
| 2003/0199290 A1 | 10/2003 | Viertola |
| 2003/0212816 A1 | 11/2003 | Bender et al. |
| 2003/0223396 A1 | 12/2003 | Tsai et al. |
| 2004/0001563 A1 | 1/2004 | Scarpa |
| 2004/0005897 A1 | 1/2004 | Tomoe et al. |
| 2004/0017311 A1 * | 1/2004 | Thomas et al. ............... 342/450 |
| 2004/0043746 A1 | 3/2004 | Hiramatsu |
| 2004/0062302 A1 | 4/2004 | Fujii et al. |
| 2004/0081124 A1 | 4/2004 | Black et al. |
| 2004/0081248 A1 | 4/2004 | Parolari |
| 2004/0082356 A1 | 4/2004 | Walton et al. |
| 2004/0085917 A1 | 5/2004 | Fitton et al. |
| 2004/0085936 A1 | 5/2004 | Gopalakrishnan et al. |
| 2004/0116122 A1 | 6/2004 | Zeira et al. |
| 2004/0131007 A1 | 7/2004 | Smee et al. |
| 2004/0141525 A1 | 7/2004 | Bhushan et al. |
| 2004/0157614 A1 | 8/2004 | Fujita et al. |
| 2004/0160933 A1 | 8/2004 | Odenwalder et al. |
| 2004/0168113 A1 | 8/2004 | Murata et al. |
| 2004/0185868 A1 | 9/2004 | Jain et al. |
| 2004/0198404 A1 | 10/2004 | Attar et al. |
| 2004/0203913 A1 | 10/2004 | Ogino et al. |
| 2004/0223507 A1 | 11/2004 | Kuchibhotla et al. |
| 2004/0223538 A1 | 11/2004 | Zeira |
| 2004/0229615 A1 | 11/2004 | Agrawal |
| 2004/0240400 A1 | 12/2004 | Khan |
| 2004/0240416 A1 | 12/2004 | Derryberry et al. |
| 2005/0013263 A1 | 1/2005 | Kim et al. |
| 2005/0018614 A1 | 1/2005 | Kiran et al. |
| 2005/0037718 A1 | 2/2005 | Kim et al. |
| 2005/0037775 A1 | 2/2005 | Moeglein et al. |
| 2005/0053088 A1 | 3/2005 | Cheng et al. |
| 2005/0058154 A1 | 3/2005 | Lee et al. |
| 2005/0084045 A1 | 4/2005 | Stewart et al. |
| 2005/0111408 A1 | 5/2005 | Skillermark et al. |

(56) References Cited

U.S. PATENT DOCUMENTS

| | | |
|---|---|---|
| 2005/0147024 A1* | 7/2005 | Jung et al. .................. 370/203 |
| 2005/0153695 A1 | 7/2005 | Cho |
| 2005/0185364 A1 | 8/2005 | Bell et al. |
| 2005/0195889 A1 | 9/2005 | Grant et al. |
| 2005/0213505 A1 | 9/2005 | Iochi et al. |
| 2005/0220042 A1 | 10/2005 | Chang et al. |
| 2005/0232174 A1 | 10/2005 | Onggosanusi et al. |
| 2005/0249163 A1 | 11/2005 | Kim et al. |
| 2005/0265399 A1 | 12/2005 | El-Maleh et al. |
| 2005/0265465 A1 | 12/2005 | Hosur et al. |
| 2005/0277429 A1 | 12/2005 | Laroia et al. |
| 2006/0003792 A1 | 1/2006 | Gholmieh et al. |
| 2006/0050666 A1 | 3/2006 | Odenwalder |
| 2006/0109938 A1 | 5/2006 | Challa et al. |
| 2006/0126491 A1 | 6/2006 | Ro et al. |
| 2006/0126765 A1 | 6/2006 | Shin et al. |
| 2006/0126844 A1 | 6/2006 | Mauro |
| 2006/0141935 A1 | 6/2006 | Hou et al. |
| 2006/0142038 A1 | 6/2006 | Ozarow et al. |
| 2006/0146953 A1 | 7/2006 | Raghothaman et al. |
| 2006/0146969 A1 | 7/2006 | Zhang et al. |
| 2006/0203943 A1 | 9/2006 | Scheim et al. |
| 2006/0209783 A1 | 9/2006 | Jain et al. |
| 2006/0209902 A1 | 9/2006 | Grilli et al. |
| 2006/0209982 A1 | 9/2006 | De Gaudenzi et al. |
| 2006/0227853 A1 | 10/2006 | Liang et al. |
| 2006/0234715 A1* | 10/2006 | Cho et al. .................. 455/447 |
| 2007/0021148 A1 | 1/2007 | Mahini |
| 2007/0040704 A1 | 2/2007 | Smee et al. |
| 2007/0050189 A1 | 3/2007 | Cruz-Zeno et al. |
| 2007/0058709 A1 | 3/2007 | Chen et al. |
| 2007/0058746 A1 | 3/2007 | Gueguen |
| 2007/0063897 A1* | 3/2007 | Matsuda ...................... 342/463 |
| 2007/0071145 A1* | 3/2007 | Perets ......................... 375/346 |
| 2007/0076707 A1 | 4/2007 | Link et al. |
| 2007/0086513 A1 | 4/2007 | Fernandez-Corbaton et al. |
| 2007/0110095 A1 | 5/2007 | Attar et al. |
| 2007/0112564 A1 | 5/2007 | Jelinek |
| 2007/0121554 A1 | 5/2007 | Luo et al. |
| 2007/0121764 A1 | 5/2007 | Chen et al. |
| 2007/0127608 A1 | 6/2007 | Scheim et al. |
| 2007/0133423 A1 | 6/2007 | Okumura |
| 2007/0133475 A1 | 6/2007 | Peisa et al. |
| 2007/0150787 A1 | 6/2007 | Kim et al. |
| 2007/0150788 A1 | 6/2007 | Zhuyan |
| 2007/0183483 A1* | 8/2007 | Narayan et al. .............. 375/148 |
| 2007/0201548 A1 | 8/2007 | Badri-Hoeher et al. |
| 2007/0273698 A1 | 11/2007 | Du et al. |
| 2008/0019308 A1 | 1/2008 | Chuan-Lin et al. |
| 2008/0019467 A1 | 1/2008 | He |
| 2008/0031368 A1 | 2/2008 | Lindoff et al. |
| 2008/0057963 A1 | 3/2008 | Kayama et al. |
| 2008/0076432 A1 | 3/2008 | Senarath et al. |
| 2008/0080363 A1 | 4/2008 | Black et al. |
| 2008/0080406 A1 | 4/2008 | Peplinski et al. |
| 2008/0101440 A1 | 5/2008 | Lee |
| 2008/0125070 A1 | 5/2008 | Grieco et al. |
| 2008/0212462 A1* | 9/2008 | Ahn et al. .................... 370/209 |
| 2008/0227456 A1* | 9/2008 | Huang et al. ................ 455/436 |
| 2008/0232439 A1 | 9/2008 | Chen |
| 2008/0298521 A1 | 12/2008 | Wu |
| 2008/0298524 A1* | 12/2008 | Koorapaty et al. .......... 375/348 |
| 2008/0305790 A1 | 12/2008 | Wakabayashi |
| 2009/0022098 A1 | 1/2009 | Novak et al. |
| 2009/0052591 A1 | 2/2009 | Chen |
| 2009/0058728 A1 | 3/2009 | Mostafa et al. |
| 2009/0092178 A1* | 4/2009 | Sayana et al. ............... 375/227 |
| 2009/0109907 A1 | 4/2009 | Tsai et al. |
| 2009/0207944 A1 | 8/2009 | Furman et al. |
| 2009/0213971 A1 | 8/2009 | Park et al. |
| 2009/0232052 A1 | 9/2009 | Black et al. |
| 2009/0303968 A1 | 12/2009 | Jou et al. |
| 2009/0303976 A1 | 12/2009 | Jou et al. |
| 2009/0304024 A1 | 12/2009 | Jou et al. |
| 2010/0027702 A1 | 2/2010 | Vijayan et al. |
| 2010/0029213 A1 | 2/2010 | Wang |
| 2010/0040035 A1* | 2/2010 | Shapiro et al. ................ 370/342 |
| 2010/0046595 A1 | 2/2010 | Sikri et al. |
| 2010/0046660 A1 | 2/2010 | Sikri et al. |
| 2010/0046682 A1 | 2/2010 | Sikri et al. |
| 2010/0054212 A1 | 3/2010 | Tang |
| 2010/0061496 A1 | 3/2010 | Black et al. |
| 2010/0097955 A1 | 4/2010 | Jou |
| 2010/0172383 A1 | 7/2010 | Montalvo et al. |
| 2010/0202544 A1 | 8/2010 | Osseirar et al. |
| 2010/0248666 A1 | 9/2010 | Hui et al. |
| 2010/0278227 A1 | 11/2010 | Sikri et al. |
| 2010/0296556 A1 | 11/2010 | Rave et al. |
| 2010/0310026 A1 | 12/2010 | Sikri et al. |
| 2011/0051859 A1 | 3/2011 | Canpolat et al. |
| 2011/0051864 A1 | 3/2011 | Chalia et al. |
| 2011/0264976 A1 | 10/2011 | Yang et al. |
| 2011/0305303 A1 | 12/2011 | Sikri et al. |
| 2012/0243515 A1 | 9/2012 | Xue et al. |
| 2012/0281675 A1 | 11/2012 | Liang et al. |
| 2014/0187248 A1 | 7/2014 | Black et al. |

FOREIGN PATENT DOCUMENTS

| | | |
|---|---|---|
| CN | 1278382 A | 12/2000 |
| CN | 1304589 A | 7/2001 |
| CN | 1311612 A | 9/2001 |
| CN | 1315095 A | 9/2001 |
| CN | 1394407 A | 1/2003 |
| CN | 1447549 A | 10/2003 |
| CN | 1497857 A | 5/2004 |
| CN | 1552133 A | 12/2004 |
| CN | 1736101 A | 2/2006 |
| CN | 1742457 A | 3/2006 |
| CN | 1758563 A | 4/2006 |
| CN | 1893406 A | 1/2007 |
| CN | 1906862 A | 1/2007 |
| CN | 1983913 A | 6/2007 |
| CN | 101189901 A | 5/2008 |
| CN | 101366305 A | 2/2009 |
| CN | 101465689 A | 6/2009 |
| CN | 101483499 A | 7/2009 |
| EP | 0396403 A1 | 11/1990 |
| EP | 0949766 A2 | 10/1999 |
| EP | 0969608 A2 | 1/2000 |
| EP | 1168703 A2 | 1/2002 |
| EP | 1199833 A2 | 4/2002 |
| EP | 1347611 A1 | 9/2003 |
| EP | 1398984 A1 | 3/2004 |
| EP | 1404047 A2 | 3/2004 |
| EP | 1411693 A2 | 4/2004 |
| EP | 1422900 A1 | 5/2004 |
| EP | 1478117 A2 | 11/2004 |
| EP | 1569399 A1 | 8/2005 |
| EP | 1643737 A1 | 4/2006 |
| EP | 1677433 A1 | 7/2006 |
| EP | 1681775 A2 | 7/2006 |
| EP | 1699194 A1 | 9/2006 |
| EP | 1699195 A1 | 9/2006 |
| EP | 1701565 A1 | 9/2006 |
| EP | 1703659 A2 | 9/2006 |
| EP | 1821497 A1 | 8/2007 |
| EP | 1928138 A2 | 6/2008 |
| GB | 2337417 | 11/1999 |
| JP | 62239735 A | 10/1987 |
| JP | 10500811 | 1/1998 |
| JP | H10327126 A | 12/1998 |
| JP | 2000059290 A | 2/2000 |
| JP | 2000261397 A | 9/2000 |
| JP | 2001036964 A | 2/2001 |
| JP | 2001078252 | 3/2001 |
| JP | 2001166026 A | 6/2001 |
| JP | 2001512916 A | 8/2001 |
| JP | 3210915 B2 | 9/2001 |
| JP | 2001257626 A | 9/2001 |
| JP | 2001267987 A | 9/2001 |
| JP | 2001519113 | 10/2001 |
| JP | 2002009741 A | 1/2002 |
| JP | 2002506583 | 2/2002 |

(56) References Cited

FOREIGN PATENT DOCUMENTS

| | | |
|---|---|---|
| JP | 2002507342 A | 3/2002 |
| JP | 2002508129 A | 3/2002 |
| JP | 2002532008 T | 9/2002 |
| JP | 2002539711 A | 11/2002 |
| JP | 2002353824 | 12/2002 |
| JP | 2003051762 A | 2/2003 |
| JP | 2003152603 A | 5/2003 |
| JP | 2003194916 A | 7/2003 |
| JP | 2003244103 A | 8/2003 |
| JP | 2003338779 A | 11/2003 |
| JP | 2004048307 A | 2/2004 |
| JP | 2004112094 A | 4/2004 |
| JP | 2004511189 A | 4/2004 |
| JP | 2004512733 A | 4/2004 |
| JP | 2004159277 A | 6/2004 |
| JP | 2004166218 A | 6/2004 |
| JP | 2004194288 A | 7/2004 |
| JP | 2004531975 A | 10/2004 |
| JP | 2004343754 A | 12/2004 |
| JP | 2005065197 A | 3/2005 |
| JP | 2005510940 A | 4/2005 |
| JP | 2006503485 A | 1/2006 |
| JP | 2006180266 A | 7/2006 |
| JP | 2006191582 A | 7/2006 |
| JP | 2006191587 A | 7/2006 |
| JP | 2006314086 A | 11/2006 |
| JP | 2007503169 A | 2/2007 |
| JP | 2007195247 A | 8/2007 |
| JP | 2007524269 A | 8/2007 |
| JP | 2008053889 A | 3/2008 |
| JP | 2008199493 A | 8/2008 |
| JP | 2008278338 A | 11/2008 |
| JP | 2008539664 A | 11/2008 |
| JP | 2009545219 A | 12/2009 |
| JP | 2011521373 A | 7/2011 |
| JP | 2011524115 A | 8/2011 |
| JP | 5490796 B2 | 5/2014 |
| KR | 20010031665 | 4/2001 |
| KR | 20010085143 A | 9/2001 |
| KR | 20020092136 | 12/2002 |
| KR | 20030059528 A | 7/2003 |
| KR | 20040097893 A | 11/2004 |
| KR | 20050073113 A | 7/2005 |
| KR | 20050097552 A | 10/2005 |
| KR | 20070091214 A | 9/2007 |
| KR | 20070104633 A | 10/2007 |
| KR | 20080039772 A | 5/2008 |
| RU | 2211531 C2 | 8/2003 |
| RU | 2233033 C2 | 7/2004 |
| RU | 2233045 C2 | 7/2004 |
| RU | 2280329 C1 | 7/2006 |
| RU | 2301493 | 6/2007 |
| RU | 2319307 C2 | 3/2008 |
| RU | 2323529 C2 | 4/2008 |
| TW | 365717 | 8/1999 |
| TW | 200640202 | 11/2006 |
| TW | 200704232 | 1/2007 |
| WO | WO-9526593 | 10/1995 |
| WO | WO-9818212 | 4/1998 |
| WO | WO-9832231 A1 | 7/1998 |
| WO | 9857509 A2 | 12/1998 |
| WO | WO-9857452 A1 | 12/1998 |
| WO | WO-9901950 A2 | 1/1999 |
| WO | 9912273 A1 | 3/1999 |
| WO | WO-9923844 A2 | 5/1999 |
| WO | WO-9929048 | 6/1999 |
| WO | WO-0033528 A1 | 6/2000 |
| WO | WO-0035126 A1 | 6/2000 |
| WO | 0055992 A1 | 9/2000 |
| WO | WO-0062456 A1 | 10/2000 |
| WO | WO-0070786 A1 | 11/2000 |
| WO | WO-0108324 | 2/2001 |
| WO | WO-0117158 | 3/2001 |
| WO | WO-0223792 A1 | 3/2002 |
| WO | 0230004 | 4/2002 |
| WO | 0232003 A1 | 4/2002 |
| WO | WO-0233877 A1 | 4/2002 |
| WO | WO02067444 A1 | 8/2002 |
| WO | WO-02103920 A2 | 12/2002 |
| WO | WO-03001834 A1 | 1/2003 |
| WO | WO-03017527 | 2/2003 |
| WO | WO-03021905 A1 | 3/2003 |
| WO | 03047124 A1 | 6/2003 |
| WO | WO-03067783 | 8/2003 |
| WO | WO-03079577 A2 | 9/2003 |
| WO | WO-03096635 A1 | 11/2003 |
| WO | WO-03105370 A1 | 12/2003 |
| WO | 2004010573 A1 | 1/2004 |
| WO | WO-2004015909 A1 | 2/2004 |
| WO | WO-2004025869 A2 | 3/2004 |
| WO | WO-2004025986 A2 | 3/2004 |
| WO | WO-2004032369 A2 | 4/2004 |
| WO | 2004066666 | 8/2004 |
| WO | WO-2004084480 A1 | 9/2004 |
| WO | WO-2004102864 A1 | 11/2004 |
| WO | 2004107768 A2 | 12/2004 |
| WO | WO-2004114582 A1 | 12/2004 |
| WO | WO-2005020464 A1 | 3/2005 |
| WO | WO-2005034383 A2 | 4/2005 |
| WO | WO-2005036913 A1 | 4/2005 |
| WO | 2005053177 A1 | 6/2005 |
| WO | WO-2005060192 A1 | 6/2005 |
| WO | WO-2006004948 | 1/2006 |
| WO | WO-2006071761 | 7/2006 |
| WO | WO-2006115979 A1 | 11/2006 |
| WO | 2007000620 A1 | 1/2007 |
| WO | WO-2007016553 A1 | 2/2007 |
| WO | 2007029958 A1 | 3/2007 |
| WO | WO-2007024963 | 3/2007 |
| WO | 2007060093 A1 | 5/2007 |
| WO | WO-2007053840 | 5/2007 |
| WO | WO2007060229 A1 | 5/2007 |
| WO | WO2007140338 | 12/2007 |
| WO | 2008012265 A1 | 1/2008 |
| WO | WO-2008005890 | 1/2008 |
| WO | WO-2008027192 A2 | 3/2008 |
| WO | WO-2008156061 A1 | 12/2008 |
| WO | WO-2009105611 A1 | 8/2009 |
| WO | WO2009108586 | 9/2009 |
| WO | 2009137464 A2 | 11/2009 |
| WO | 2009140338 A2 | 11/2009 |
| WO | 2009152138 A2 | 12/2009 |
| WO | WO-2010014968 A1 | 2/2010 |

OTHER PUBLICATIONS

Huaiyu D AI, et al., "Asymptotic spectral efficiency of multi cell mimo systems with frequency-flat fading" IEEE Transactions on Signal Processing, IEEE Service Center, New York, NY, US, vol. 51, No. 11, Nov. 1, 2003, pp. 2976-2988, XP011102811.

International Search Report and Written Opinion- PCT/US2009/052515—International Search Authority, European Patent Office, Nov. 18, 2009.

Meyr H, et al., "Digital Communication Receivers, Chapter 5 (Synthesis of Synchronization Algorithms, Chapter 8 (Frequency Estimation)", Jan. 1, 1998, Digital Communication Receivers: Synchronization, Channel Estimation, and Signal Processing; [Wiley Series in Telecommunications and Signal Processing], John Wiley and Sons, New York, p. 271-323, 445, XP002547568.

Pais A V, et al., "Indoor DS-CDMA system deployment and performance with successive interference cancellation" Electronics Letters, IEE Stevenage, GB, vol. 40, No. 19, Sep. 16, 2004, pp. 1200-1201, XP006022654.

Ritt: "Performance of IDMA-based inter-cell interference cancellation" 3GPP Draft; R1-060895, 3rd Generation Partnership Project (3GPP), Mobile Competence Centre ; 650, Route Des Lucioles ; F-06921 Sophia-Antipolis Cedex ; France, vol. RAN WG1, no. Athens, Greece; 20060320, Mar. 20, 2006, XP050101801, pp. 1-5.

Chunguang, W., et al., "Enhanced OTDOA Technology in 3G Location Service", Shanghai Research Institute of China Telecom, Shanghai 200122, China, Aug. 31, 2005.

(56) References Cited

OTHER PUBLICATIONS

Natali F.D., "AFC Tracking Algorithms" IEEE Transactions on Communications, IEEE Service Center, Piscataway, NJ, US, vol. COM-32, No. 8, Aug. 1, 1984, pp. 935-947, XP000758571 ISSN: 0090-6778 abstract p. 941, section C.
Olivier J.C., et al., "Single antenna interference cancellation for synchronised GSM networks using a widely linear receiver" (Feb. 1, 2007) pp. 131-136, XP006028092.
Sawahashi M., et al., "Multipath Interference Canceller for Orthogonal Multiplexed Channel and its Performance in W-CDMA Forward Link," Technical Report of the Institute of Electronics, Information and Communication Engineers, Jan. 12, 2001, vol. 100, No. 558, pp. 27-33, RCS2000-195.
Taiwan Search Report—TW098125914—TIPO—Aug. 16, 2012.
Xiaofa, L., "The study of Interference Cancellation based on Multi-User Detection", Chinese Scientific Papers Online, pp. 7, Mar. 27, 2008.
Divsalar, D., et al., "Improved parallel interference cancellation for CDMA", Communications, IEEE Transactions on, Feb. 1998, vol. 46, Issue: 2, pp. 258-268.
3rd Generation Partnership, Project 2 "3GPP2" Physical Layer Standard for cdma2000, Spread Spectrum Systems. Revision D, 3GPP2 C.S0002-D, Version 2.0, Sep. 30, 2005 (538 pages).
Chen, B.Y., et al., "Using H.264 Coded Block Patterns for Fast Inter-Mode Selection" Multimedia and Expo, 2008 IEEE International Conference on, IEEE, Piscataway, NJ, USA, Jun. 23, 2008, pp. 721-724, XP031312823 ISBN: 978-1-4244-2570-9.
JVT: "Draft ITU-T Recommendation and Final Draft International Standard of Joint Video Specification (ITU-T Rec. H .264 ISO/IEC 14496- 10 AVC)", 7. JVT Meeting; 64. MPEG Meeting; Mar. 7, 2003-Mar. 14, 2003; Pattaya, TH; (Joint Video Team of ISO/IEC JTC1/SC29/WG11 and ITU-T SG.16), No. JVT-G050r1, Mar. 14, 2003, XP030005712, ISSN: 0000-0427.
Lakkavalli, S., et al., "Stretchable Architectures for Next Generation Cellular Networks", ISART'03, Mar. 4, 2003, 7 pages.
NTT DoCoMo: "Text proposals for detailed channel coding," 3GPP TSG-RAN WG#7, R1-99b49, Aug. 1999, pp. 24.
"Soft Handoff and Power Control in IS-95 CDMA", CDMA95.10, Dec. 6, 1999, pp. 181-212.
Tseng, S-M., et al., Fuzzy adaptive parallel interference cancellation and vector channel prediction for CDMA in fading channels, Communications, 2002. ICC 2002. IEEE International Conference on, 2002, vol. 1, pp. 252-256.
Qualcomm Europe: "On E-DCH structure", 3GPP Draft, R1-040538, 3rd Generation Partnership Project (3GPP), Mobile Competence Centre, 650, Route Des Lucioles, F-06921 Siphia-Antipolis Cedex, France, vol. RAN WG1, No. Montreal, Canada, May 6, 2004, XP050098746, [retrieved on May 6, 2004] * Section 3 *.
Qualcomm Incorporated: "Introduction Enhancement to CS voice over DCH," 3GPP Draft; R1-123809 (3GPP), Mobile Competence Centre; 650, Route Des Lucioles; F-06921 Sophia-Antipolis Cedex; FR, vol. RAN WG1, No. Qingdao, China; Aug. 13, 2012-Aug. 17, 2012 Aug. 5, 2012. XP050661662.
Wu Q., et al., "The cdma2000 High Rate Packet Data System", Internet Citation, Mar. 26, 2002, XP002303829, Retrieved from the Internet: URL:http://www.qualcomm.com/technology/1xe v-do/publishedpapers/cdma2000HighRatePacket.pdf [retrieved on Nov. 3, 2004] Sections 3.1.7 and 3.2.
Philips, "Mapping of Transport Channels to Physical Channels [online]," 3GPP TSG-RAN WG2#51 R2-060424, <URL:http://www.3gpp.org/ftp/tsg_ran/WG2_RL2/TSGR2_51/Documents/R2-060424.zip>, Feb. 2006.

* cited by examiner

CELL DETECTION WITH INTERFERENCE CANCELLATION

The present application claims priority to provisional U.S. Application Ser. No. 61/085,757, entitled "JOINT HIGHLY DETECTABLE PILOT AND INTERFERENCE CANCELLATION FOR CELLULAR POSITIONING," filed Aug. 1, 2008, assigned to the assignee hereof and incorporated herein by reference.

BACKGROUND

I. Field

The present disclosure relates generally to communication, and more specifically to techniques for detecting for cells in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of cells that can support communication for a number of user equipments (UEs). A UE may be within the coverage of one or more cells at any given moment, e.g., depending on the current UE location. The UE may not know which cells are within range. The UE may perform a search to detect for cells and to acquire timing and other information for the detected cells. It may be desirable to detect for cells in a manner to obtain good performance, e.g., to detect as many cells as possible.

SUMMARY

Techniques for performing cell detection with interference cancellation are described herein. In an aspect, a UE may detect for pilots from cells in a wireless network using interference cancellation, which may enable the UE to detect pilots from more cells. For cell detection with interference cancellation, the UE may process a received signal to detect for pilots from one or more cells. The pilots may comprise common pilots transmitted with a reuse factor of one or low reuse pilots transmitted with a reuse factor greater than one. The UE may estimate the interference due to a detected cell (e.g., the strongest detected cell) and may cancel the estimated interference from the received signal. The UE may then process the interference-canceled signal to detect for pilots from additional cells. The UE may be able to detect pilots from more cells, e.g., from weaker cells, by canceling the interference due to the pilots from the detected cells. This may be desirable for various applications such as positioning.

Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

Figure 1:
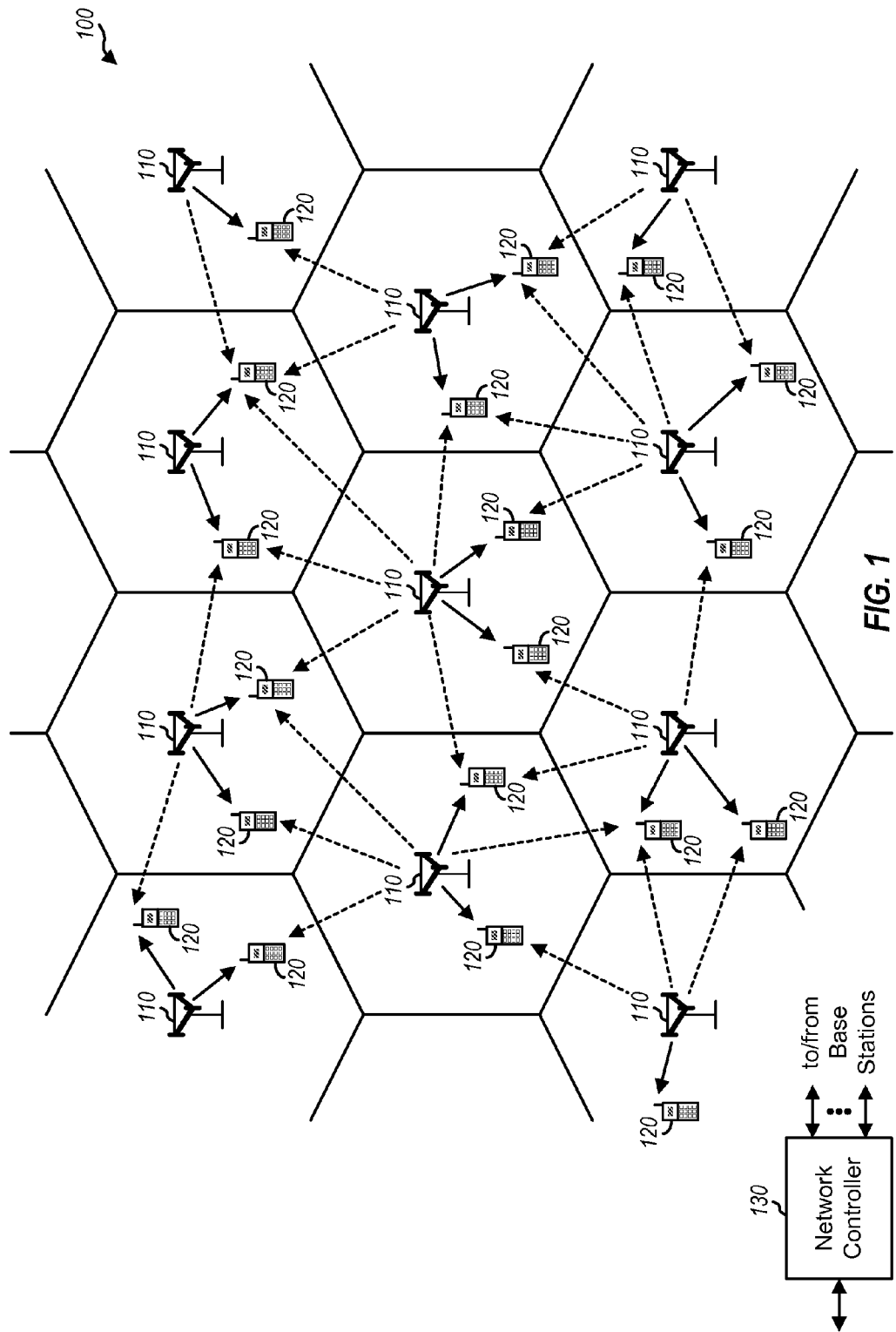
FIG. 1 shows a wireless communication network.

FIG. 1 shows a wireless communication network 100 with multiple base stations 110. A base station may be a station that communicates with the UEs and may also be referred to as a Node B, an evolved Node B (eNB), an access point, etc. Each base station 110 may provide communication coverage for a particular geographic area. In 3GPP, the term "cell" can refer to a coverage area of a base station and/or a base station subsystem serving this coverage area, depending on the context in which the term is used. In 3GPP2, the term "sector" or "cell-sector" can refer to a coverage area of a base station and/or a base station subsystem serving this coverage area. For clarity, 3GPP2 concept of "cell" is used in the description below. A base station may support one or multiple (e.g., three) cells.

Wireless network 100 may be a homogeneous network that includes base stations of one type, e.g., only macro base stations. Wireless network 100 may also be a heterogeneous network that includes base stations of different types, e.g., macro, pico, and/or femto base stations that provide coverage for macro, pico and/or femto cells, respectively. A macro base station may cover a relatively large geographic area (e.g., several kilometers in radius) and may allow unrestricted access by terminals with service subscription. A pico base station may cover a relatively small geographic area and may allow unrestricted access by terminals with service subscription. A femto or home base station may cover a relatively small geographic area (e.g., a home) and may allow restricted access by terminals having association with the femto cell (e.g., terminals for users in the home). Wireless network 100 may also include relay stations. The techniques described herein may be used for both homogeneous and heterogeneous networks. A network controller 130 may couple to a set of base stations and provide coordination and control for the base stations.

UEs 120 may be dispersed throughout wireless network 100, and each UE may be stationary or mobile. A UE may also be referred to as a mobile station, a terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may communicate with a base station via the downlink and uplink. The downlink (or forward link) refers to the communication link from the base station to the UE, and the uplink (or reverse link) refers to the communication link from the UE to the base station. In FIG. 1, a solid line with a single arrow indicates a UE receiving a data transmission from a serving cell, and a dashed line with a single arrow indicates a UE receiving pilot from a cell. Uplink transmissions are not shown in FIG. 1.

Wireless network 100 may utilize a reuse factor of one, which means that a given frequency channel may be used by all cells in the wireless network. Using a reuse factor of one may improve spectral efficiency and may also reduce complexity of frequency planning in wireless network 100.

Each cell in wireless network 100 may transmit a common pilot, which may be used by UEs for cell detection, time synchronization, channel estimation, etc. A pilot is a signal or transmission that is known a priori by a transmitter and a receiver. A pilot may also be referred to as a reference signal, a preamble, etc. A common pilot is a pilot transmitted to all UEs. A common pilot may also be referred to as a cell-specific reference signal, etc.

Each cell may also transmit a low reuse pilot (LRP), which may have wider coverage and better hearability than the common pilot. A low reuse pilot is a pilot that is transmitted with a reuse factor greater than one, so that only a fraction of the cells transmit their low reuse pilots on a given time and/or frequency resource. For example, with a reuse factor of M, where M>1, only one out of every M cells may transmit its low reuse pilot on a given resource. A higher reuse factor (i.e., a larger value of M) corresponds to lower reuse, and vice versa. A low reuse pilot from a given cell may observe less interference from low reuse pilots from other cells, which may enable detection of the low reuse pilot by more UEs. A low reuse pilot may also be referred to as a highly detectable pilot (HDP), a positioning assistance reference signal (PA-RS), a low reuse preamble, etc. A UE may be able to detect cells farther away based on the low reuse pilots transmitted by these cells.

A UE may have difficulty detecting the common pilots from neighboring cells due to strong interference from the closest cells. This near-far effect may result in a hearability problem, which may reduce accuracy of cellular network-based positioning of the UE. The hearability problem may be mitigated by increasing pilot processing gain, e.g., by transmitting more pilot symbols for the common pilots on more resources and/or transmitting the common pilots at higher transmit power. However, pilot processing gain may not be a feasible solution to the near-far problem due to physical resource limitation and/or channel coherence time.

The low reuse pilots can reduce the adverse effect of a dominant cell on the detection of other cells. The cells may transmit their low reuse pilots in accordance with a multiplexing pattern. Each cell may transmit its low reuse pilot with a probability of p=1/M in each LRP transmission opportunity and may transmit its low reuse pilot once every M LRP transmission opportunities. Each cell may transmit its low reuse pilot in various manners. Several exemplary designs of low reuse pilots are described below.

Figure 2:
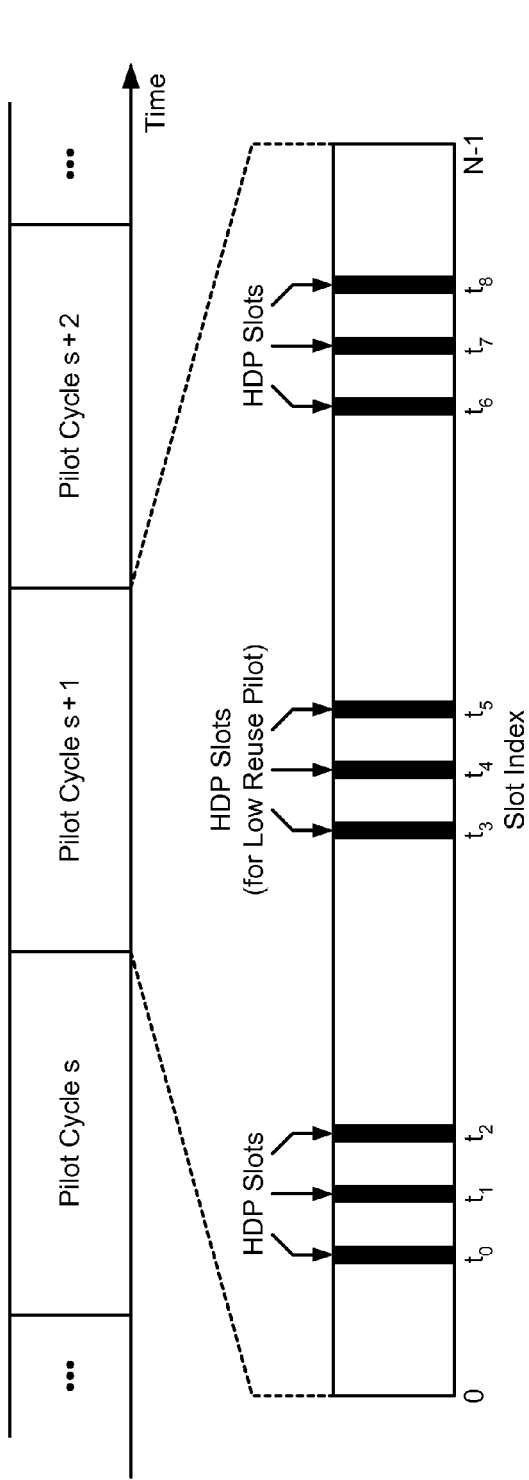
FIG. 2 shows an exemplary transmission structure for a low reuse pilot.

FIG. 2 shows an exemplary transmission structure for low reuse pilots in a High Rate Packet Data (HRPD) network that implements IS-856. A low reuse pilot may be referred to as a highly detectable pilot (HDP) in HRPD. In HRPD, the transmission timeline for the downlink may be partitioned into units of slots, with each slot having a duration of 1.667 milliseconds (ms). The transmission timeline may also be partitioned into pilot cycles with sequentially increasing indices. Each pilot cycle may cover N slots with indices of 0 through N−1, where N may be equal to 768, 2304, or some other value. In each pilot cycle, M slots with indices of $t_0, t_1, \ldots, t_{M-1}$ may be available for sending HDP and may be referred to as HDP slots. M may be equal to 9 (for HRPD, as shown in FIG. 2) or some other value. M may be a small percentage of N, so that overhead due to HDP may be negligible. The M HDP slots $t_0$ to $t_{M-1}$ may be dependent on the value of N and may be known by the cells and the UEs.

A given cell x may transmit its HDP in one HDP slot in each pilot cycle. Cell x may select one HDP slot in each pilot cycle based on a pseudo-random function, as follows:

$$q=f(\text{PilotPN},\text{Cell-ID},\text{Time}), \quad \text{Eq (1)}$$

where PilotPN is a pseudo-random number (PN) sequence assigned to the cell,

Cell-ID is an identity of the cell,

Time denotes absolute time, $f(\ )$ denotes a pseudo-random function, and $q \in \{0, \ldots, M-1\}$ is a random integer that determines the selected HDP slot.

Figure 3:
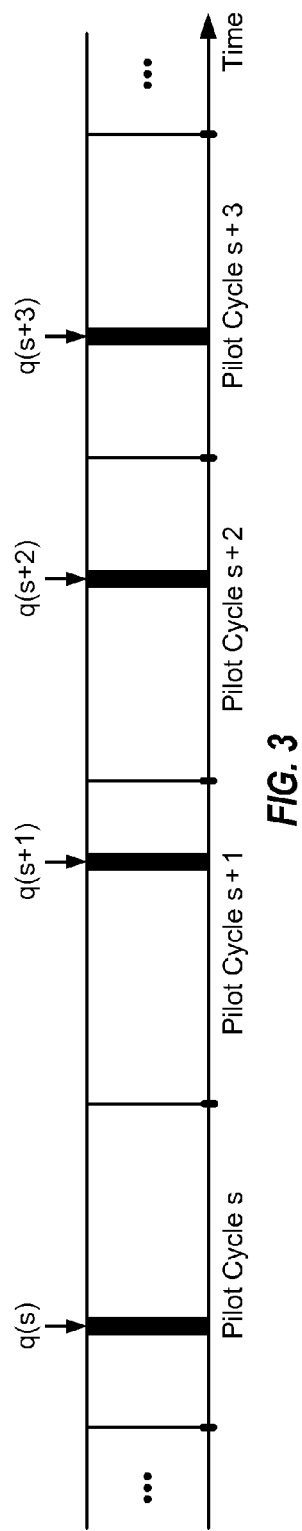
FIG. 3 shows transmission of a low reuse pilot by one cell.

FIG. 3 shows transmission of HDP by one cell x in HRPD. Cell x may provide its PilotPN, its Cell-ID, and a pilot cycle index s for Time to the pseudo-random function. In pilot cycle s, the pseudo-random function may output a value q(s), and cell x may transmit its HDP in slot $t_{q(s)}$. In the next pilot cycle s+1, the pseudo-random function may output a value q(s+1), and cell x may transmit its HDP in slot $t_{q(s+1)}$. Cell x may transmit its HDP in a similar manner in each subsequent pilot cycle.

Cell x may generate an HDP transmission for an HDP slot by spreading a predefined symbol sequence (e.g., all zeros) with a Walsh sequence, scaling the resultant bits, and scrambling the scaled bits with the PN sequence assigned to cell x. The HDP transmission may thus carry only the assigned PN sequence.

As shown in FIGS. 2 and 3, cell x may transmit its HDP in one of M (e.g., M=9) available HDP slots in each pilot cycle. A reuse factor of M may thus be achieved for the HDP in HRPD. Furthermore, cell x may transmit its HDP in different HDP slots in different pilot cycles in order to avoid continually colliding with the HDP from a strong neighbor cell. These features may allow more UEs to detect the HDP from cell x. In contrast, all cells in the HRPD network may transmit their common pilots in the same pilot time segments in each slot. The common pilot from cell x may thus be transmitted with a reuse factor of one, may observe more interference from the neighbor cells, and may be less detectable than the HDP from cell x.

Low reuse pilots may also be transmitted on the downlink in LTE. LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing between adjacent subcarriers may be 15 KHz, and K may be equal to 83, 166, 333, 666 or 1333 for system bandwidth of 1.25, 2.5, 5, 10 or 20 MHz, respectively.

Figure 4:
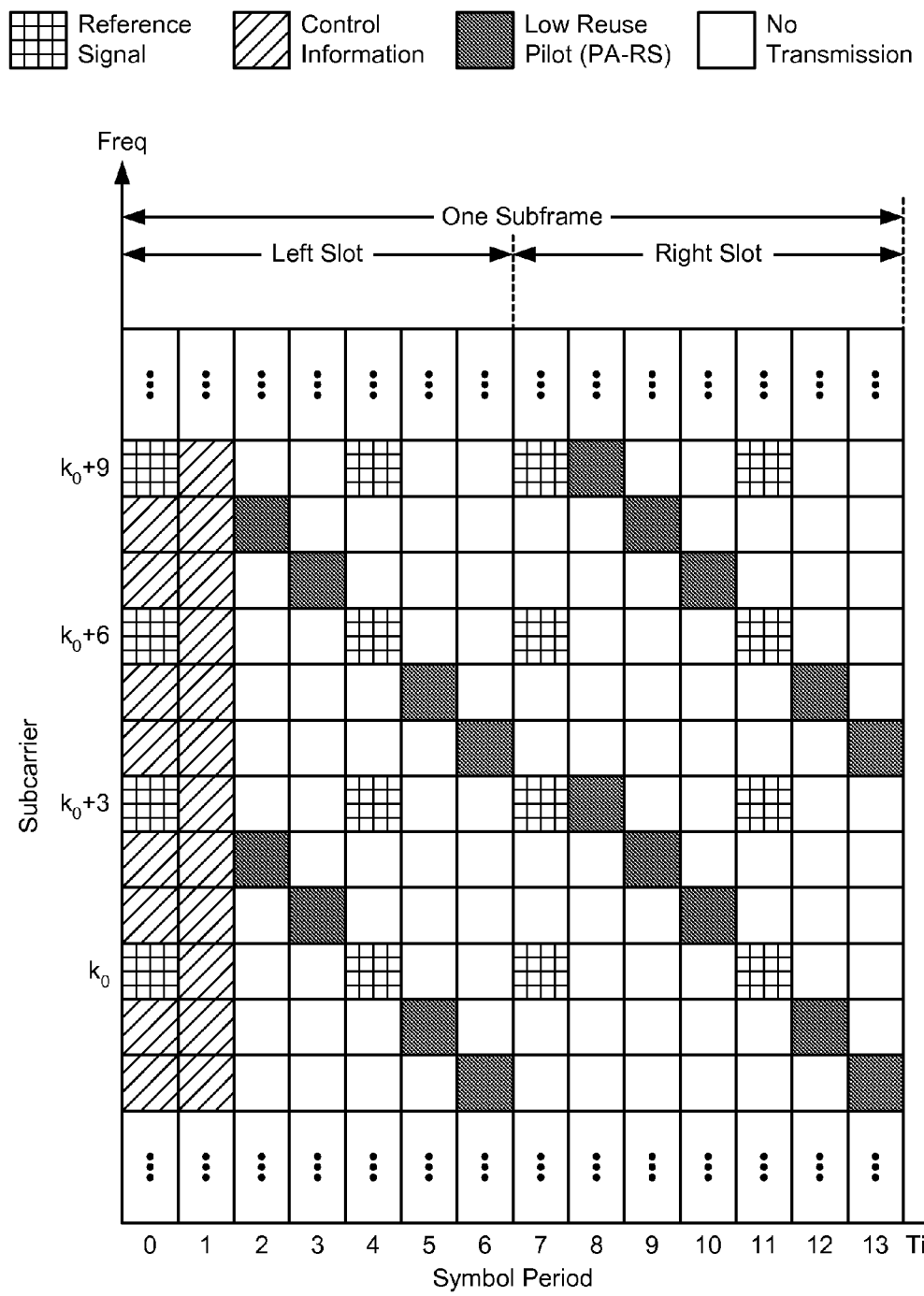
FIG. 4 shows another exemplary transmission structure for a low reuse pilot.

FIG. 4 shows an exemplary transmission structure for low reuse pilots in an LTE network. A low reuse pilot may be referred to as a positioning assistance reference signal (PA-RS) in LTE. In LTE, the transmission timeline for the downlink may be partitioned into units of radio frames. Each radio frame may have a duration of 10 ms and may be partitioned into 10 subframes with indices of 0 through 9. Each subframe may include two slots, and each slot may include seven symbol periods for a normal cyclic prefix (as shown in FIG. 4) or six symbol periods for an extended cyclic prefix (not shown in FIG. 4). The 14 symbol periods in each subframe for the normal cyclic prefix may be assigned indices of 0 through 13. Each symbol period may include a number of resource elements. Each resource element may cover one subcarrier in one symbol period and may be used to send one symbol, which may be a real or complex value.

A given cell x may transmit a cell-specific reference signal (or simply, a reference signal) on certain subcarriers in certain symbol periods of each subframe. In particular, for the case with two transmit antennas with the normal cyclic prefix, cell x may transmit the reference signal on every third subcarriers starting with subcarrier $k_0$ in symbol periods 0, 4, 7 and 11 of each subframe. The starting subcarrier $k_0$ may be determined based on a physical cell identity (PCI) of cell x. Cell x may transmit control information in the first L symbol periods of a subframe, with L=2 in FIG. 4. In general, L≤3 and may be configurable for each subframe.

Cell x may also transmit a PA-RS in a subframe designated for PA-RS transmission. In the design shown in FIG. 4, cell x may transmit the PA-RS in each symbol period not use for the reference signal or control information. A symbol period with a PA-RS transmission may be referred to as a PA-RS symbol period. In each PA-RS symbol period, cell x may transmit the PA-RS on every sixth subcarrier starting with a particular subcarrier. Different starting subcarriers may be used in different PA-RS symbol periods, e.g., as shown in FIG. 4, to allow the PA-RS to be transmitted on all or most of the K total subcarriers. The starting subcarriers may change over time, to avoid continual collision with the PA-RS from the same strong neighbor cell. This may allow UEs to obtain a more accurate time measurement for cell x based on the PA-RS.

Cell x may generate an OFDM symbol comprising a PA-RS transmission in various manners. In one design, cell x may generate a sample sequence based on its cell ID, permute or shuffle the sample sequence, generate modulation symbols based on the permuted samples, map the modulation symbols to subcarriers used for the PA-RS, and generate an OFDM symbol with the mapped modulation symbols. The sample sequence may be generated in similar manner as a sample sequence for a synchronization signal in order to reduce implementation complexity. The sample sequence may be permuted in different manners for different PA-RS symbol periods. Cell x may also generate an OFDM symbol with the PA-RS transmission in other manners.

In the design shown in FIG. 4, cell x may transmit its PA-RS on every sixth subcarrier in each PA-RS symbol period. A reuse factor of six may thus be achieved for the PA-RS in LTE. Furthermore, cell x may transmit its PA-RS on different subcarriers in different PA-RS symbol periods to avoid continually colliding with the PA-RS from a strong neighbor cell. Cell x may also transmit its PA-RS at a higher transmit power level since no other transmissions may be sent on the other subcarriers in each PA-RS symbol period. These features may allow more UEs to detect the PA-RS from cell x. In contrast, each cell in the LTE network may transmit its reference signal on every third subcarriers, e.g., as shown in FIG. 4, for a pilot reuse factor of three. However, the reference signal from each cell may observe interference from data transmissions sent by neighbor cells, may have an actual reuse factor of one, and may be less detectable than the PA-RS from the cell.

FIGS. 2 and 3 show an example of time multiplexing for the low reuse pilots to reduce the likelihood of collision between low reuse pilots from strong and weak cells. FIG. 4 shows an example of frequency multiplexing for the low reuse pilots to reduce the likelihood of collision between low reuse pilots from strong and weak cells. Low reuse pilots may also be transmitted with other multiplexing schemes. In any case, the low reuse pilots may allow UEs to detect pilots from more cells, including pilots from weaker cells. However, the improved hearability comes at a cost since a given resource (e.g., a slot in HRPD or a resource element in LTE) is used by only a fraction of the cells in the wireless network.

In an aspect, a UE may detect for pilots from cells in the wireless network using interference cancellation, which may enable the UE to detect pilots from more cells. For cell detection with interference cancellation, the UE may process a received signal to detect for pilots from one or more cells. The UE may estimate the interference due to a detected cell (e.g., the strongest detected cell) and may cancel the estimated interference from the received signal. The UE may be able to detect pilots from more cells, e.g., from weaker cells, by canceling the interference due to the pilots from the detected cells. Interference cancellation may improve the hearability of weaker cells and may be used for both the low reuse pilots and the common pilots.

Figure 5:
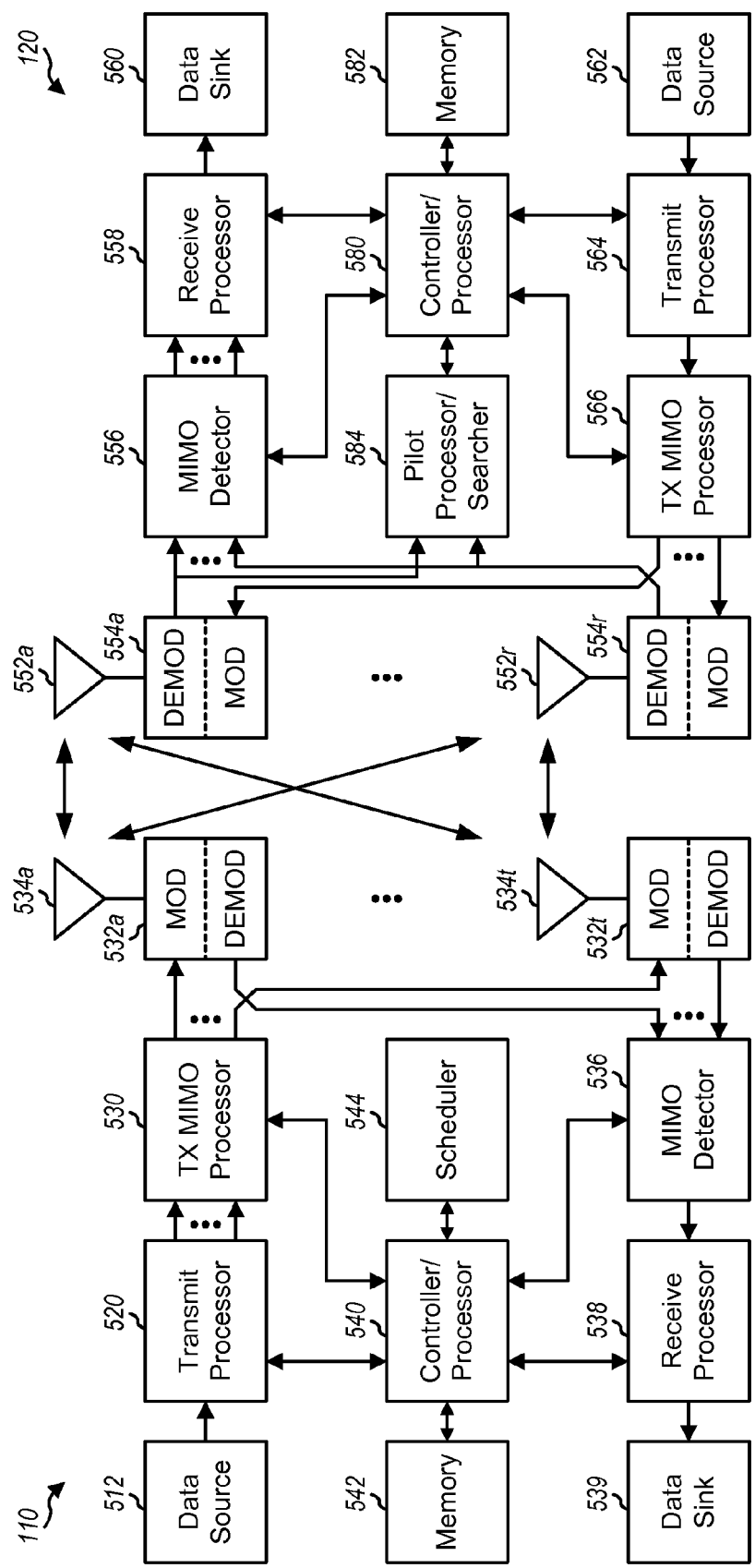
FIG. 5 shows a block diagram of a base station and a UE.

FIG. 5 shows a block diagram of a design of a base station 110 and a UE 120, which may be one of the base stations and one of the UEs in FIG. 1. Base station 110 may support one or more cells. Base station 110 may be equipped with T antennas 534a through 534t, and UE 120 may be equipped with R antennas 552a through 552r, where in general T≥1 and R≥1.

At base station 110, a transmit processor 520 may receive data for one or more UEs from a data source 512, process (e.g., encode, interleave, and symbol map) the data for each UE, and provide data symbols for all UEs. Transmit processor 520 may also process control information from a controller/processor 540 and provide control symbols. Transmit processor 520 may also generate pilot symbols for a low reuse pilot, a common pilot, and/or other pilots or reference signals for each cell supported by base station 110. A transmit (TX) multiple-input multiple-output (MIMO) processor 530 may perform precoding on the data symbols, the control symbols, and/or the pilot symbols, if applicable. Processor 530 may provide T output symbol streams to T modulators (MODs) 532a through 532t. Each modulator 532 may process a respective output symbol stream (e.g., for CDMA, OFDM, etc.) to obtain an output sample stream. Each modulator 532 may further process (e.g., convert to analog, amplify, filter, and upconvert) the output sample stream to obtain a downlink signal. T downlink signals from modulators 532a through 532t may be transmitted via T antennas 534a through 534t, respectively.

At UE 120, antennas 552a through 552r may receive the downlink signals from base station 110 and other base stations and may provide received signals to demodulators (DEMODs) 554a through 554r, respectively. Each demodulator 554 may condition (e.g., filter, amplify, downconvert, and digitize) a respective received signal to obtain input samples. Each demodulator 554 may further process the input samples (e.g., for CDMA, OFDM, etc.) to obtain received symbols. A MIMO detector 556 may obtain received symbols from all R demodulators 554a through 554r, perform receiver spatial processing on the received symbols if applicable, and provide detected symbols. A receive processor 558 may process (e.g., demodulate, deinterleave, and decode) the detected symbols, provide decoded data for UE 120 to a data sink 560, and provide decoded control information to a controller/processor 580. A pilot processor/searcher 584 may receive input samples from all demodulators 554 and may detect for pilots from cells, as described below.

On the uplink, at UE 120, a transmit processor 564 may receive and process data from a data source 562 and control information (e.g., for detected cells, time measurements, etc.) from controller/processor 580. Transmit processor 564 may also generate pilot symbols. The symbols from transmit processor 564 may be precoded by a TX MIMO processor 566 if applicable, further processed by modulators 554a through 554r, and transmitted to base station 110. At base station 110, the uplink signals from UE 120 and other UEs may be received by antennas 534, processed by demodulators 532, detected by a MIMO detector 536 if applicable, and further processed by a receive processor 538 to obtain decoded data and control information transmitted by the UEs.

Controllers/processors 540 and 580 may direct the operation at base station 110 and UE 120, respectively. Memories 542 and 582 may store data and program codes for base station 110 and UE 120, respectively. A scheduler 544 may schedule UEs for data transmission on the downlink and/or uplink and may provide resource grants for the scheduled UEs.

Figure 6:
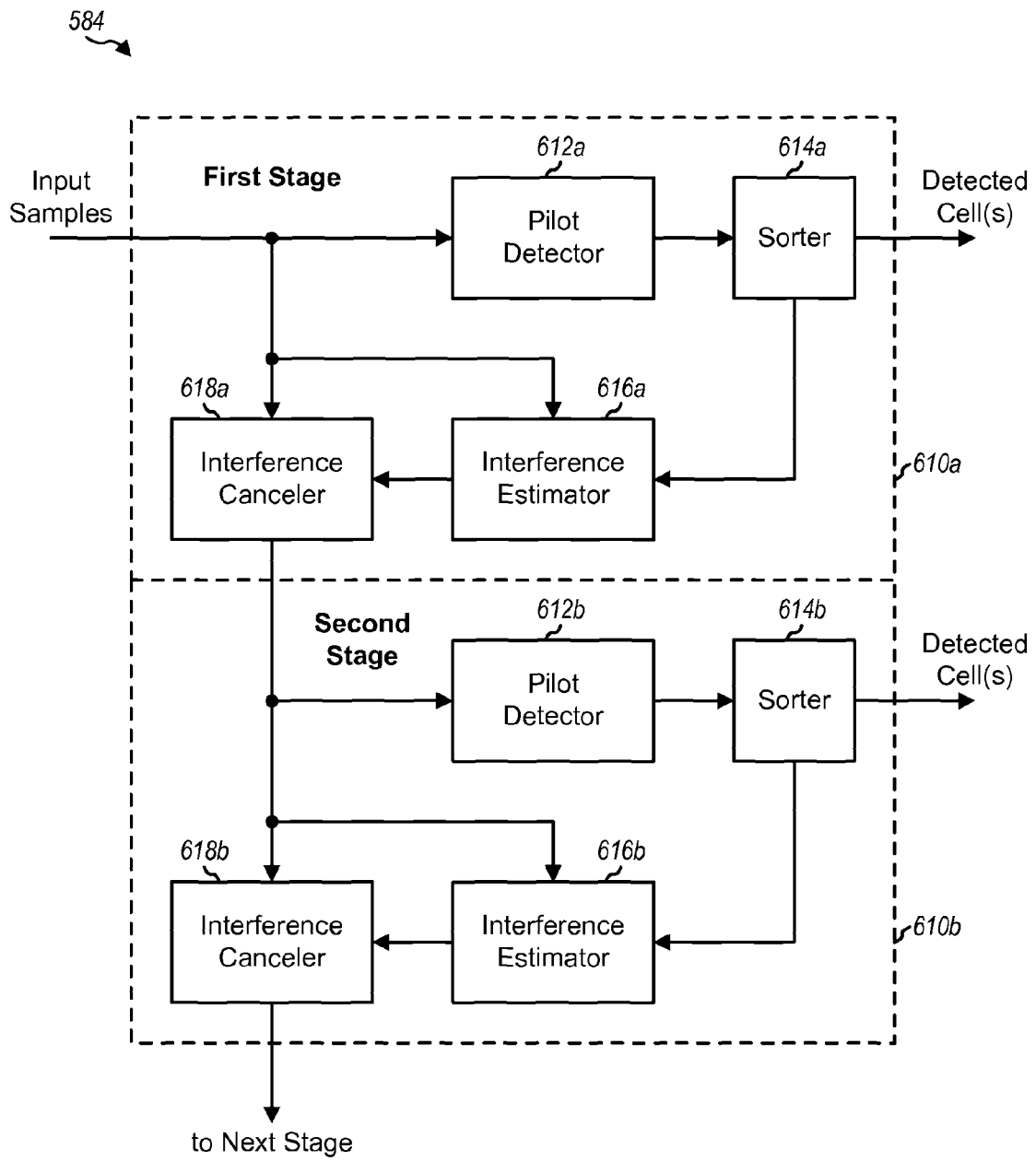
FIG. 6 shows a block diagram of a pilot processor/searcher at the UE.

FIG. 6 shows a block diagram of a design of pilot processor/searcher 584 at UE 120 in FIG. 5. In this design, pilot processor 584 may perform pilot detection and interference cancellation in multiple stages 610. For simplicity, only two stages 610a and 610b are shown in FIG. 6.

In the first stage 610a, a pilot detector 612a may receive the input samples from demodulators 554, detect for pilots (e.g., low reuse pilots) transmitted by cells based on the input samples, and provide the strength and timing of each detected cell. Pilot detector 612a may detect for pilots in a manner that is dependent on how the pilots are generated and transmitted by the cells. In one design, pilot detector 612a may locally generate a sample sequence for a pilot from a cell to be detected. The locally generated sample sequence may be for a PN sequence assigned to the cell in HRPD, an OFDM symbol comprising a PA-RS transmission in LTE, etc. Pilot detector 612a may correlate the input samples with the locally generated sample sequence at different time offsets to obtain correlation results for different time offsets for the cell. Pilot detector 612a may determine that the cell is detected if the correlation result for any time offset exceeds a detection threshold. In one design, UE 120 may receive a list of potential cells (e.g., from a serving cell), and pilot detector 612a may detect for each cell in the list. In another design, pilot detector 612a may detect for each possible cell by cycling through all possible cell IDs, e.g., all 504 cell IDs in LTE. For all designs, pilot detector 612a may provide a list of detected cells, the energy and timing of each detected, and/or other information. The energy of each detected cell may be the energy of a correlation peak for the cell.

A sorter 614a may receive the search results from pilot detector 612a and may sort the energies of the detected cells. Sorter 614a may select one or more detected cells for interference cancellation and may provide the identity of each selected cell to an interference estimator 616a. Sorter 614a may select one or more cells for interference cancellation in various manners, as described above.

Interference estimator 616a may receive the selected cell (s) from sorter 614a and the input samples and may estimate the interference due to the pilot from each selected cell. To estimate the interference due to a given selected cell, interference estimator 616a may derive a channel estimate for the selected cell based on the input samples (e.g., using the common pilot transmitted by the cell). Interference estimator 616a may locally generate the pilot from the selected cell in the same manner as the cell and may apply the locally generated pilot through the channel estimate to obtain an interference estimate. The accuracy of the interference estimate may be dependent on the accuracy of the channel estimate, which may be better for a strong cell and/or after canceling interference from a strong cell.

An interference canceller 618a may receive the input samples and the estimated interference for each selected cell from interference estimator 616a. Interference canceller 618a may subtract the estimated interference for each selected cell from the input samples and may provide interference-canceled samples to the second stage 610b.

Second stage 610b includes a pilot detector 612b, a sorter 614b, an interference estimator 616b, and an interference canceller 618b that may operate on the interference-canceled samples in similar manner as the corresponding units in the first stage 610a. Pilot detector 612b may detect for pilots (e.g., low reuse pilots) from cells not detected or not canceled in the first stage 610a. Sorter 614b may select one or more detected cells for interference cancellation. Interference estimator 616b may estimate the interference due to each selected cell. Interference canceller 618b may cancel the estimated interference for each selected cell from the interference-canceled samples and may provide new interference-canceled samples to the next stage.

In general, pilot processor 584 may include any number of stages 610 and may operate in various manners. In one design, pilot processor 584 may perform successive detection and cancellation (SDC), which may be one interference cancellation scheme. With SDC, pilot processor 584 may sort the energies of all detected cells in each stage and may select the strongest detected cell for interference cancellation in that stage. Detection performance may improve by canceling the interference from the strongest cell in each stage and then processing the interference-canceled samples in the next stage. This may result in a more accurate estimate of the interference from the strongest cell detected in the next stage based on the interference-canceled samples having low interference from the strongest cell detected in each prior stage.

In another design, pilot processor 584 may perform interference cancellation for all detected cells in each stage. For each stage, pilot processor 584 may estimate the interference due to each detected cell in that stage, cancel the interference due to all detected cells, and provide interference-canceled samples to the next stage. In yet another design, pilot processor 584 may perform interference cancellation for a predetermined number of strongest detected cells in each stage. In yet another design, pilot processor 584 may perform interference cancellation for all detected cells with energies exceeding a threshold in each stage. The threshold may be a fixed value that can provide good performance. The threshold may also be a configurable value, which may be set to a particular percentage of the total received energy of the UE. Pilot processor 584 may also perform interference cancellation in other manners.

Pilot processor 584 may perform pilot detection and interference cancellation in multiple stages, e.g., as shown in FIG. 6. Pilot processor 584 may provide search results for one or more detected cells in each stage and may also cancel the interference from one or more selected cells in each stage. Pilot processor 584 may repeat the pilot detection and interference cancellation until a termination condition is encountered. This termination condition may occur when a target number of cells have been detected, when all cells in a list of potential cells have been detected, when pilot processor 584 cannot detect any more cells, etc.

Detection performance with the use of low reuse pilots and/or interference cancellation was ascertained via computer simulation. The computer simulation models a cellular network with 37 base stations, with each base station having three cells, and each cell having a radius of 750 meters. In the simulation, each cell transmits a common pilot with a reuse factor of one (M=1) and a low reuse pilot with a reuse factor of greater than one (M>1). The common pilot is thus transmitted without multiplexing, and the low reuse pilot is transmitted with multiplexing. A number of UEs are randomly placed throughout the center cell in the cellular network. Each UE can detect for the common pilots or the low reuse pilots with or without interference cancellation.

Figure 7A:
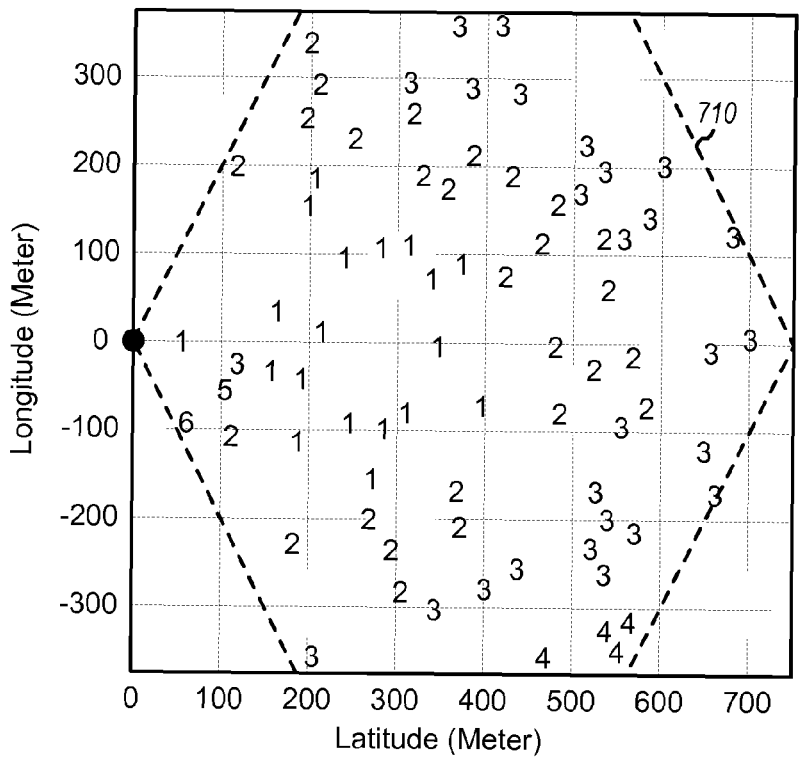
FIGS. 7A to 7D show detection performance for four cell detection schemes for common pilots and low reuse pilots, with and without interference cancellation.

FIG. 7A shows detection performance for the common pilots (M=1) without interference cancellation at UEs in a given cell x. The coverage of cell x is represented by a hexagonal shape 710, which is a rough approximation of an antenna pattern for cell x. Cell x is located at a longitude of 0 meter and a latitude of 0 meter, i.e., in the middle of the left vertical axis. UEs are placed at randomly selected locations throughout cell x. Detection performance is quantified by the number of cells that the UEs can detect based on the common pilots without interference cancellation. In particular, a value of k at a given location in FIG. 7A indicates that a UE at that location can detect k cells, where k may be any integer value.

As shown in FIG. 7A, the hearability of the common pilots without interference cancellation is generally poor. UEs located near the middle of cell x can detect only one or few cells due to strong interference from cell x. UEs located at the edges of cell x may be able to detect more cells due to less interference from cell x. The detection performance in FIG. 7A may be typical for most cellular networks with a reuse factor of one.

Figure 7B:
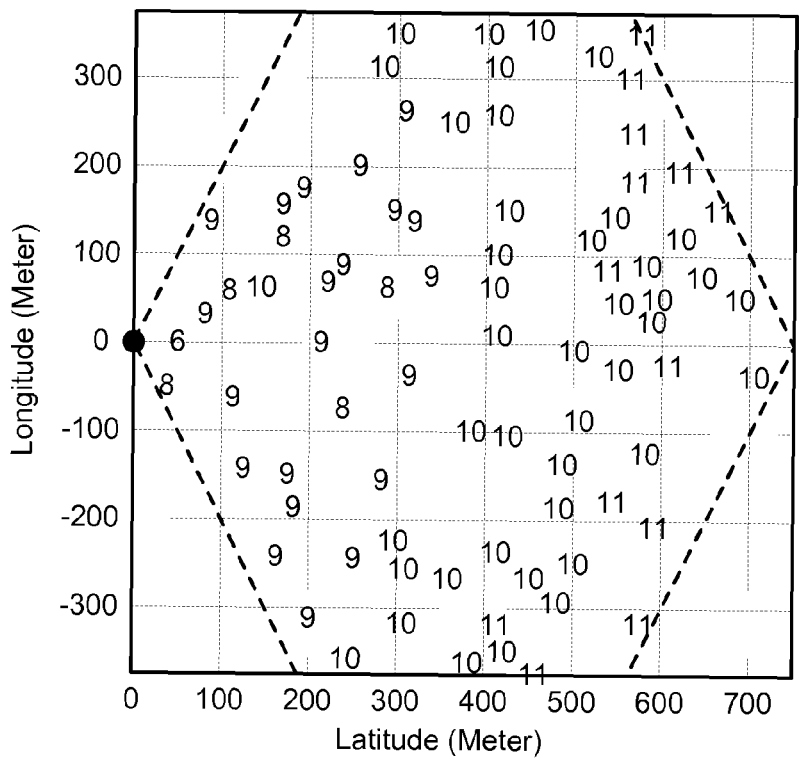

FIG. 7B shows detection performance for the low reuse pilots with a reuse factor of M=4 and no interference cancellation at the UEs in cell x. As shown in FIG. 7B, the hearability of the low reuse pilots without interference cancellation is improved over the hearability of the common pilots in FIG. 7A. UEs located throughout cell x can detect nine or more cells in most cases. The improvement in hearability and the number of detected cells is not dependent on the UE locations since the interference from cell x is eliminated on resources (e.g., HDP slots or PA-RS resource elements) reserved for low reuse pilots but not used by cell x for its low reuse pilot.

Figure 7C:
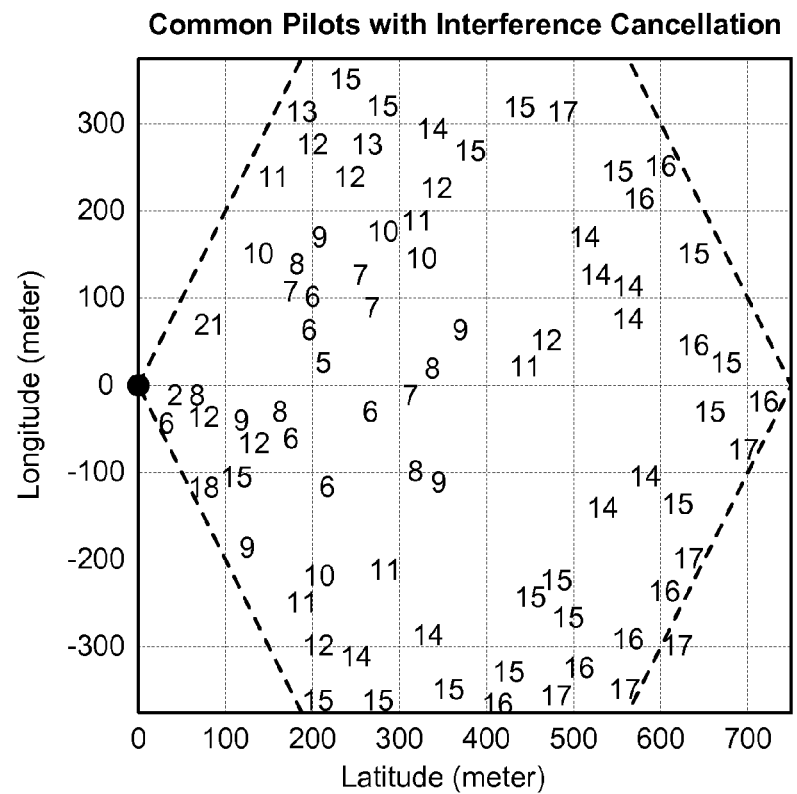

FIG. 7C shows detection performance for the common pilots (M=1) with interference cancellation at the UEs in cell x. As shown in FIG. 7C, the hearability of the common pilots with interference cancellation is improved over the hearability of the common pilots without interference cancellation in FIG. 7A. UEs located throughout cell x can detect more cells with interference cancellation. UEs located at the edges of cell x can generally detect more cells than UEs located near the middle of cell x due to less interference from cell x. The hearability with interference cancellation may be better than the hearability with the low reuse pilots, except at locations close to cell x transmitter.

Figure 7D:
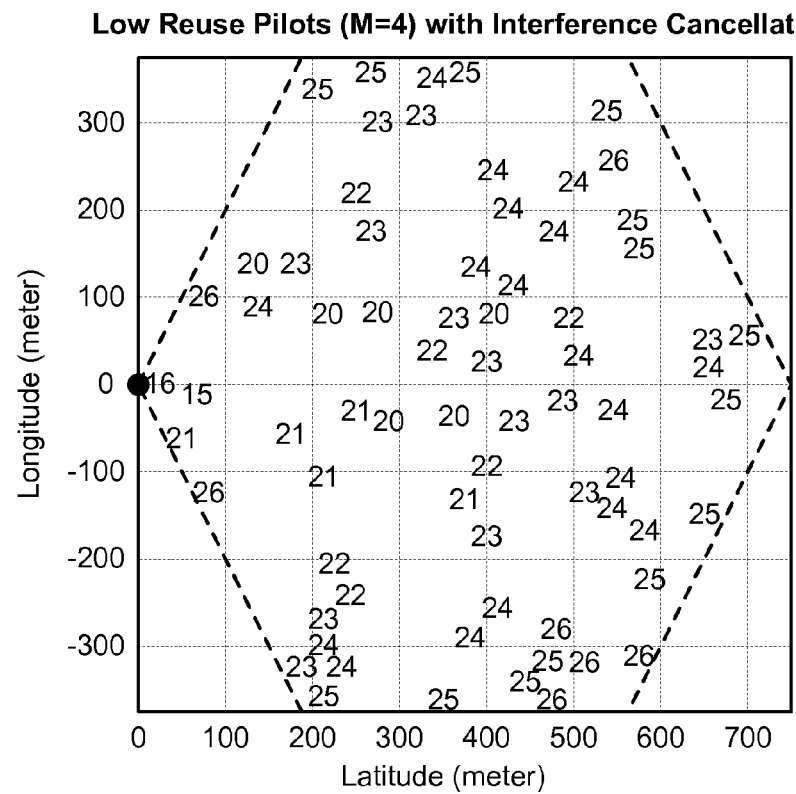

FIG. 7D shows detection performance for the low reuse pilots with a reuse factor of M=4 and interference cancellation at the UEs in cell x. As shown in FIG. 7D, the hearability of the low reuse pilots with interference cancellation is much improved over both (i) the hearability of the low reuse pilots without interference cancellation in FIG. 7B and (ii) the hearability of the common pilots with interference cancellation in FIG. 7C. UEs located throughout cell x can detect more cells based on the low reuse pilots with interference cancellation. Furthermore, the improvement in hearability and the number of detected cells is generally not dependent on the UE locations.

Figure 8:
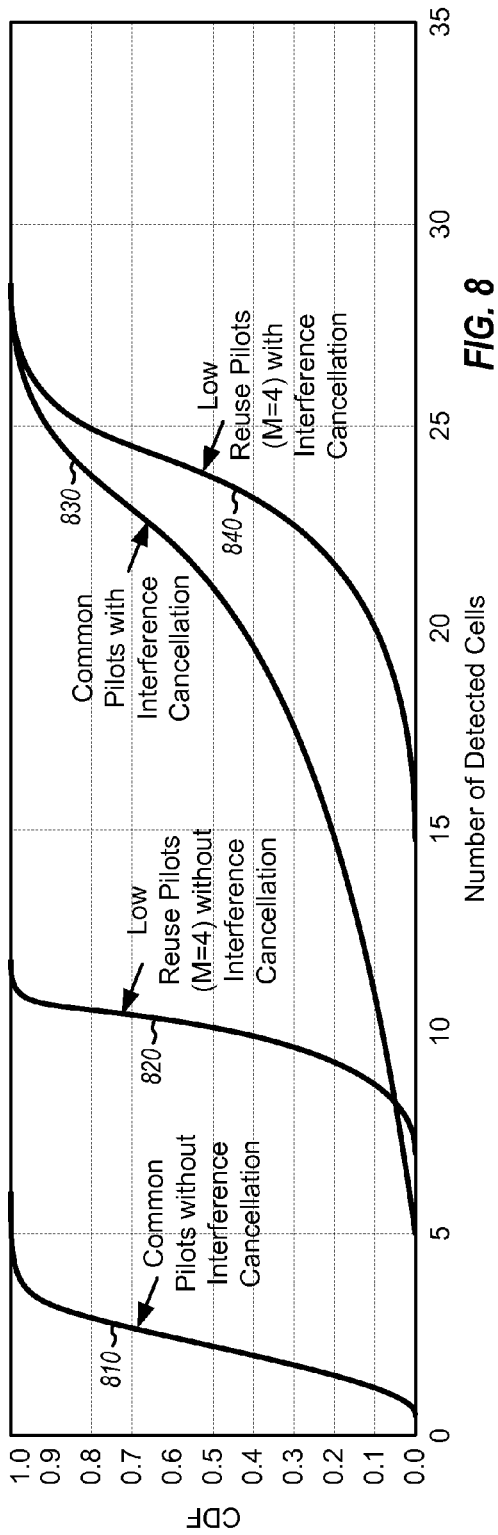
FIG. 8 shows plots of cumulative distribution function (CDF) of number of detected cells for the four cell detection schemes.

FIG. 8 shows CDF of the number of detected cells for the four configurations shown in FIGS. 7A to 7D. The horizontal axis represents the number of detected cells, and the vertical axis represents CDF. A plot 810 shows the CDF of the number of detected cells for the common pilots without interference cancellation, which correspond to the configuration in FIG. 7A. A plot 820 shows the CDF of the number of detected cells for the low reuse pilots with M=4 and no interference cancellation, which correspond to the configuration in FIG. 7B. A plot 830 shows the CDF of the number of detected cells for the common pilots with interference cancellation, which correspond to the configuration in FIG. 7C. A plot 840 shows the CDF of the number of detected cells for the low reuse pilots with M=4 and interference cancellation, which correspond to the configuration in FIG. 7D. As shown in FIG. 8, the number of detected cells may greatly improve with the use of the low reuse pilots and/or interference cancellation.

In general, detection performance may be improved by using multiplexing with a higher reuse factor. Progressively higher reuse factor may result in progressively greater hearability but may also require more overhead for the low reuse pilots. A higher reuse factor may also result in a longer time to detect for the low reuse pilots and may further result in a longer delay to obtain a location estimate based on the detected low reuse pilots. Multiplexing may be more effective in terms of improving hearability at locations with a strong dominant pilot, e.g., close to a cell transmitter. Multiplexing may also result in more uniform hearability throughout the cell, e.g., as shown in FIG. 7B.

Detection performance may also be improved by using interference cancellation, which may be applicable for both the common pilots and the low reuse pilots. Interference cancellation can provide good detection performance even with a small reuse factor. It can be shown that detection performance for the low reuse pilots with M=4 and interference cancellation is better than detection performance for the low reuse pilots with M=8 and no interference cancellation. Interference cancellation may thus be used to improve detection performance and/or reduce the reuse factor M.

The techniques described herein may be used for various applications such as positioning of UEs. A UE may detect for pilots (e.g., low reuse pilots) from different cells with interference cancellation to increase the number of cells that can be detected. The UE may obtain a time measurement (e.g., a time of arrival (TOA) measurement) based on the pilot from each detected cell. A location estimate for the UE may be derived based on the time measurements for the detected cells and their known locations using trilateration. The accuracy of the location estimate may improve and the location error may reduce with more detected cells.

Figure 9:
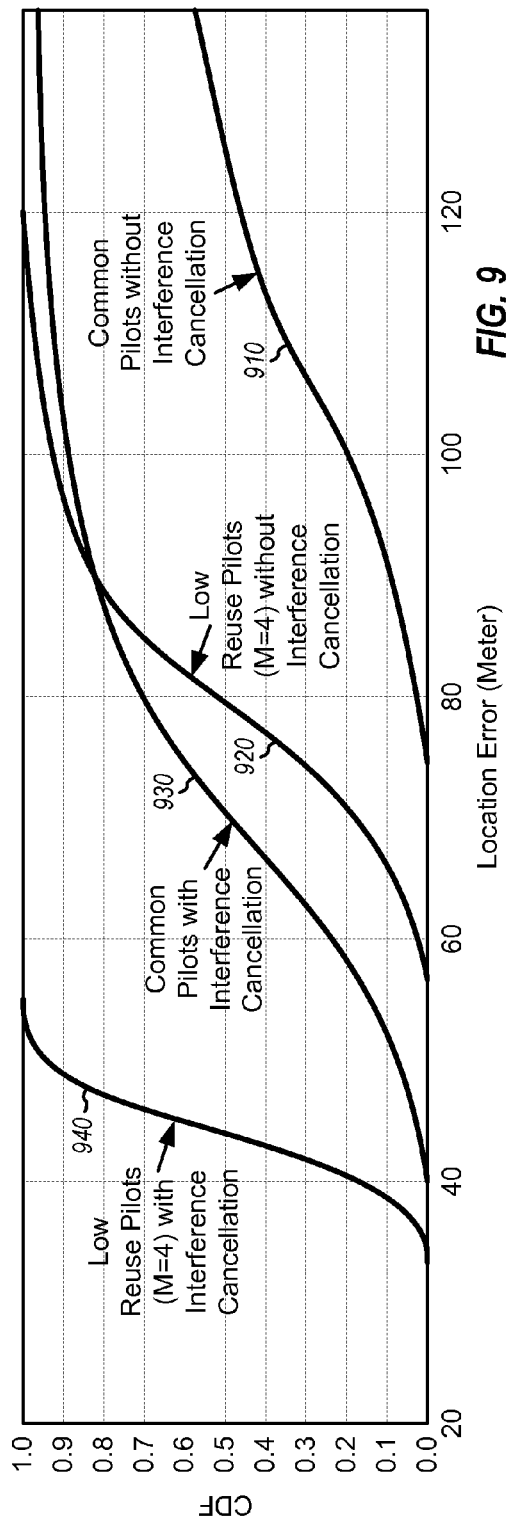
FIG. 9 shows plots of CDF of location error for the four cell detection schemes.

FIG. 9 shows CDF of location error for a location estimate obtained with the four configurations shown in FIGS. 7A to 7D. The horizontal axis represents location error in units of meters, and the vertical axis represents CDF. A plot 910 shows the CDF of location error with the common pilots and no interference cancellation. A plot 920 shows the CDF of location error with the low reuse pilots with M=4 and no interference cancellation. A plot 930 shows the CDF of location error with the common pilots and interference cancellation. A plot 940 shows the CDF of location error with the low reuse pilots with M=4 and interference cancellation. As shown in FIG. 9, the location error may greatly reduce with the use of the low reuse pilots and/or interference cancellation.

As shown in FIGS. 7A to 9, interference cancellation may reduce the adverse impact of the near-far effect by canceling interference from strong cells to improve the hearability of weaker cells. Low reuse pilots with a reuse factor of greater than one may improve hearability in a uniform manner across a cell. The joint use of the low reuse pilots and interference cancellation may significantly improve detection performance. For a given detection performance, the reuse factor for the low reuse pilots may be reduced by employing interference cancellation. The smaller reuse factor may reduce overhead for the low reuse pilots, enable faster detection of the low reuse pilots from different cells, and reduce delay in obtaining a location estimate for a UE, all of which may be highly desirable. Furthermore, a more accurate location estimate may be obtained with more detected cells due to the use of the low reuse pilots and/or interference cancellation.

Figure 10:
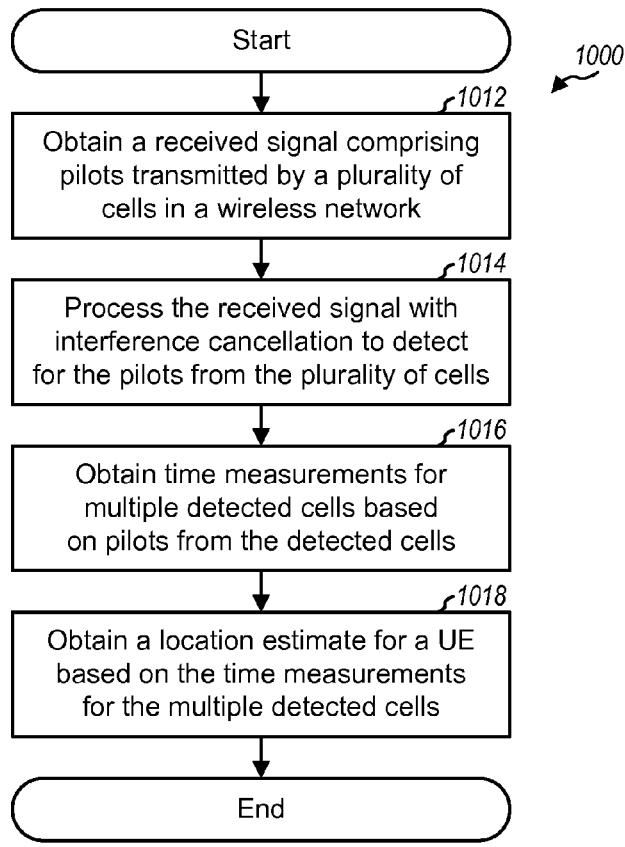
FIG. 10 shows a process for performing cell detection by a UE.

FIG. 10 shows a design of a process 1000 for performing cell detection by a UE. The UE may obtain a received signal comprising pilots transmitted by a plurality of cells in a wireless network (block 1012). The UE may process the received signal with interference cancellation to detect for the pilots from the plurality of cells (block 1014). The interference cancellation may improve the number of detected cells. In one design, the pilots may comprise common pilots transmitted by the plurality of cells with a reuse factor of one. In another design, the pilots may comprise low reuse pilots transmitted by the plurality of cells with a reuse factor greater than one. Each cell may transmit its low reuse pilot on a subset of time slots available for transmitting the low reuse pilots (e.g., as shown in FIG. 3), or on a subset of subcarriers available for transmitting the low reuse pilots (e.g., as shown in FIG. 4), or on other resources available for transmitting the low reuse pilots.

Figure 11:
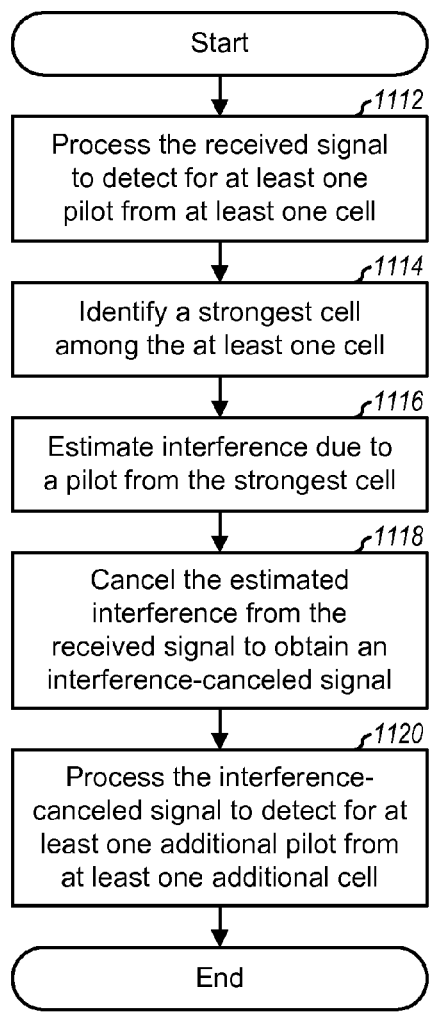
FIG. 11 shows a process for performing successive detection and cancellation.

FIG. 11 shows a design of block 1014 in FIG. 10, which implements successive detection and cancellation (SDC) for interference cancellation. The UE may process the received signal to detect for at least one pilot from at least one cell (block 1112). The UE may identify a strongest cell among the at least one cell (block 1114). The UE may then estimate the interference due to a pilot from the strongest cell (block 1116). The UE may cancel the estimated interference from the received signal to obtain an interference-canceled signal (block 1118). The UE may then process the interference-canceled signal to detect for at least one additional pilot from at least one additional cell (block 1120). The UE may repeat blocks 1114 to 1120 for any number of cells.

In another design of block 1014 in FIG. 10, the UE may perform pilot detection and interference cancellation in multiple stages, e.g., as shown in FIG. 6. For each stage, the UE may detect for one or more pilots from one or more cells and may select at least one cell for interference cancellation from among the one or more detected cells. The selected cell(s) may be the strongest cell or may be determined as described above. The UE may cancel the interference due to the at least one selected cell. For each selected cell, the UE may derive a channel estimate for the selected cell after canceling the interference from prior selected cells, generate a pilot for the selected cell, estimate the interference due to the selected cell based on the generated pilot and the channel estimate for the selected cell, and cancel the estimated interference. The UE may terminate the pilot detection and interference cancellation when no more pilots can be detected, or when a list of cells have been detected, or when a predetermined number of cells have been detected, or when some other termination is countered.

Referring back to FIG. 10, in one design, the UE may obtain time measurements for multiple detected cells based on the pilots from these cells (block 1016). The UE may then obtain a location estimate for itself based on the time measurements for the multiple detected cells (block 1018). The UE may compute the location estimate based on the time measurements and the known locations of the detected cells, e.g., using trilateration. Alternatively, the UE may send the time measurements to the network, which may compute the location estimate for the UE. In another design, the UE may identify the multiple detected cells and may obtain a location estimate for itself based on the identities of the detected cells, e.g., using an enhanced cell ID positioning method. For all designs, the location estimate may have improved accuracy due to the higher number of detected cells with interference cancellation.

Figure 12:
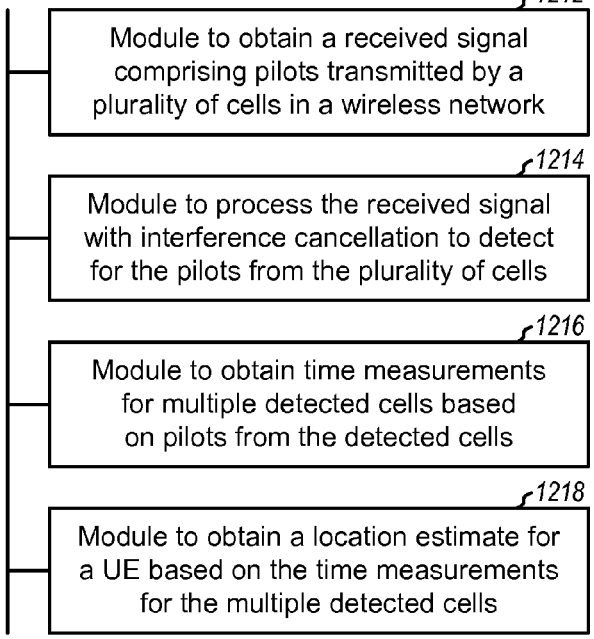
FIG. 12 shows an apparatus for performing cell detection.

FIG. 12 shows a design of an apparatus 1200 for performing cell detection. Apparatus 1200 includes a module 1212 to obtain a received signal comprising pilots transmitted by a plurality of cells in a wireless network, a module 1214 to process the received signal with interference cancellation to detect for the pilots from the plurality of cells, a module 1216 to obtain time measurements for multiple detected cells based on the pilots from the detected cells, and a module 1218 to obtain a location estimate for a UE based on the time measurements for the detected cells.

The modules in FIG. 12 may comprise processors, electronics devices, hardware devices, electronics components, logical circuits, memories, software codes, firmware codes, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of detecting for cells in a wireless communication network, comprising:
    obtaining a received signal comprising pilots transmitted by a plurality of cells in the wireless network; and
    processing the received signal with interference cancellation to detect for the pilots, wherein the processing of the received signal comprises performing pilot detection and interference cancellation of the received signal in multiple stages, each stage of the multiple stages comprising:
        detecting one or more pilots from one or more cells from the plurality of cells;
        selecting at least one cell for interference cancellation from the one or more cells based in part on the one or more pilots;
        deriving at least one channel estimate for the at least one selected cell;
        generating at least one pilot for the at least one selected cell;
        estimating interference due to the at least one selected cell based on the at least one generated pilot and the at least one channel estimate; and
        canceling interference due to the at least one selected cell from the received signal based on the estimated interference.

2. The method of claim 1, wherein the at least one selected cell includes a strongest cell, and the canceling of the interference yields an interference-canceled signal for a next stage.

3. The method of claim 1, wherein the processing the received signal with interference cancellation comprises terminating the pilot detection and interference cancellation, after at least one iteration, when no pilot is detected.

4. The method of claim 1, wherein the processing the received signal with interference cancellation comprises terminating the pilot detection and interference cancellation, after at least one iteration, when all cells in a list of cells have been detected, or when a predetermined number of cells have been detected, or when a termination condition is encountered.

5. The method of claim 1, further comprising:
    obtaining time measurements for the at least one selected cell based on the one or more pilots; and
    obtaining a location estimate for a user equipment (UE) based on the time measurements for the at least one selected cell.

6. The method of claim 1, further comprising:
    obtaining a location estimate for a user equipment (UE) based on the one or more cells.

7. The method of claim 1, wherein the pilots comprise common pilots transmitted by the plurality of cells with a reuse factor of one.

8. The method of claim 1, wherein the pilots comprise low reuse pilots transmitted by the plurality of cells with a reuse factor greater than one.

9. The method of claim 8, wherein each cell transmits a low reuse pilot on a subset of time slots available for transmitting the low reuse pilots.

10. The method of claim 8, wherein each cell transmits a low reuse pilot on a subset of subcarriers available for transmitting the low reuse pilots.

11. An apparatus for wireless communication, comprising:
means for obtaining a received signal comprising pilots transmitted by a plurality of cells; and
means for processing the received signal with interference cancellation to detect for the pilots, including:
means for performing pilot detection and interference cancellation in multiple stages in the received signal, wherein, for each stage of the multiple stages, the means for performing pilot detection and interference cancellation:
detects one or more pilots from one or more cells from the plurality of cells,
selects at least one cell from the one or more cells based in part on the one or more pilots,
derives at least one channel estimate for the at least one selected cell,
generates at least one pilot for the at least one selected cell
estimates interference due to the at least one selected cell based on the at least one generated pilot and the at least one channel estimate, and
cancels interference due to the at least one selected cell from the received signal based on the estimated interference.

12. The apparatus of claim 11, wherein the one or more cells include a strongest cell, and the canceling of the interference from the received signal yields an interference-canceled signal for a next stage.

13. The apparatus of claim 11, further comprising means for obtaining a location estimate for a user equipment (UE) based on the one or more cells.

14. The apparatus of claim 11, further comprising:
means for obtaining time measurements for the one or more cells based on the one or more pilots; and
means for obtaining a location estimate for a user equipment (UE) based on the time measurements for the one or more cells.

15. An apparatus for wireless communication, comprising:
at least one processor configured to:
obtain a received signal comprising pilots transmitted by a plurality of cells in a wireless communication network; and
process the received signal to detect for the pilots from the plurality of cells at least in part by performing pilot detection and interference cancellation in multiple stages, and for each stage of the multiple stages:
detecting one or more pilots in the received signal from one or more cells from the plurality of cells,
selecting at least one cell from the one or more cells based in part on the one or more pilots,
deriving a at least one channel estimate for the at least one selected cell,
generating at least one pilot for the at least one selected cell,
estimating interference due to the at least one selected cell based on the at least one generated pilot and the at least one channel estimate, and
canceling interference due to the at least one selected cell from the received signal based on the estimated interference.

16. The apparatus of claim 15, wherein the one or more cells include a strongest cell, and the at least one processor performs interference cancellation to yield an interference-canceled signal for a next stage.

17. The apparatus of claim 15, wherein the at least one processor is configured to obtain a location estimate for a user equipment (UE) based on the one or more cells.

18. The apparatus of claim 15, wherein the at least one processor is configured to obtain time measurements for the one or more cells based on the one or more pilots, and to obtain a location estimate for a user equipment (UE) based on the time measurements for the one or more cells.

19. A computer program product, stored on a non-transitory computer-readable medium, comprising code for causing at least one computer to:
obtain a received signal comprising pilots transmitted by a plurality of cells in a wireless communication network, and
process the received signal to detect for the pilots from the plurality of cells at least in part by performing pilot detection and interference cancellation in multiple stages, and for each stage of the multiple stages:
detecting one or more pilots from one or more cells from the plurality of cells,
selecting at least one cell for interference cancellation from among the one or more cells,
deriving at least one channel estimate for the at least one selected cell;
generating at least one pilot for the at least one selected cell;
estimating interference due to the at least one selected cell based on the at least one generated pilot and the at least one channel estimate; and
canceling interference due to the at least one selected cell based on the estimated interference.

20. The computer program product of claim 19, wherein the one or more cells include a strongest cell, and the pilot detection and interference cancellation yields an interference-canceled signal for a next stage.

* * * * *